(12) United States Patent
Jeong et al.

(10) Patent No.: US 11,669,470 B2
(45) Date of Patent: Jun. 6, 2023

(54) STORAGE SYSTEM WITH CAPACITY SCALABILITY AND METHOD OF OPERATING THE SAME

(71) Applicant: SAMSUNG ELECTRONICS CO., LTD., Suwon-si (KR)

(72) Inventors: Sungwon Jeong, Suwon-si (KR); Jinhyuk Lee, Seoul (KR); Younghoi Heo, Uijeongbu-si (KR); Jaeshin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 17/211,064

(22) Filed: Mar. 24, 2021

(65) Prior Publication Data

US 2021/0406205 A1   Dec. 30, 2021

(30) Foreign Application Priority Data

Jun. 24, 2020   (KR) .......................... 10-2020-0077061

(51) Int. Cl.
*G06F 13/10* (2006.01)
*G06F 13/16* (2006.01)

(52) U.S. Cl.
CPC ................ *G06F 13/1668* (2013.01)

(58) Field of Classification Search
CPC .... G06F 13/1668; G06F 3/067; G06F 3/0659; G06F 3/061; G06F 3/0607; G06F 3/0679;
(Continued)

(56) References Cited

U.S. PATENT DOCUMENTS

| 8,484,415 B2 | 7/2013 | Cho |
| 8,738,846 B2 | 5/2014 | Son et al. |

(Continued)

FOREIGN PATENT DOCUMENTS

| CN | 201110132513 | 5/2011 | |
| CN | 110347359 A | * 10/2019 | ............. G06F 13/28 |
| TW | 201102827 A | * 1/2011 | ......... G06F 12/0246 |

OTHER PUBLICATIONS

European Search Report dated Oct. 6, 2021 in corresponding European Patent Application No. 21166537.7 (10 pages).

*Primary Examiner* — Cheng Yuan Tseng

(74) *Attorney, Agent, or Firm* — F. Chau & Associates, LLC

(57) ABSTRACT

The present disclosure provides a storage system including a first storage device (e.g., a main storage device) and one or more additional storage devices (e.g., sub storage devices). The first storage device includes a host interface for communicating with a host device and is directly connected to the host device. The additional storage devices may be directly connected to the first storage device and may communicate with the host device through the host interface included in the first storage device. The storage system thus has a total combined capacity of both the capacity of the first storage device and the capacity of the one or more additional storage devices. Further, the one or more additional storage devices may be added or removed to increase or decrease the total capacity of the storage system, and the one or more additional storage devices may not necessarily themselves include a host interface.

20 Claims, 23 Drawing Sheets

(58) Field of Classification Search
CPC ... G06F 3/0604; G06F 3/0605; G06F 12/0246
See application file for complete search history.

(56) References Cited

U.S. PATENT DOCUMENTS

| | | |
|---|---|---|
| 8,904,088 B2 | 12/2014 | Heo et al. |
| 8,943,227 B2 * | 1/2015 | Klughart ............ G06F 13/4072 |
| | | 710/5 |
| 9,055,044 B2 * | 6/2015 | Takagi ................ G06F 3/0665 |
| 9,652,343 B2 * | 5/2017 | Klughart ............... G06F 13/409 |
| 10,057,534 B2 | 8/2018 | Vadura et al. |
| 10,175,885 B2 | 1/2019 | Kanno et al. |
| 10,283,170 B2 | 5/2019 | Tuma |
| 2004/0184230 A1 | 9/2004 | Szolyga |
| 2011/0167201 A1 | 7/2011 | Huang |
| 2013/0086311 A1 | 4/2013 | Huang et al. |
| 2019/0333566 A1 * | 10/2019 | Kim ................... G11C 11/40611 |
| 2021/0342083 A1 * | 11/2021 | Byun .................... G06F 3/0644 |

\* cited by examiner

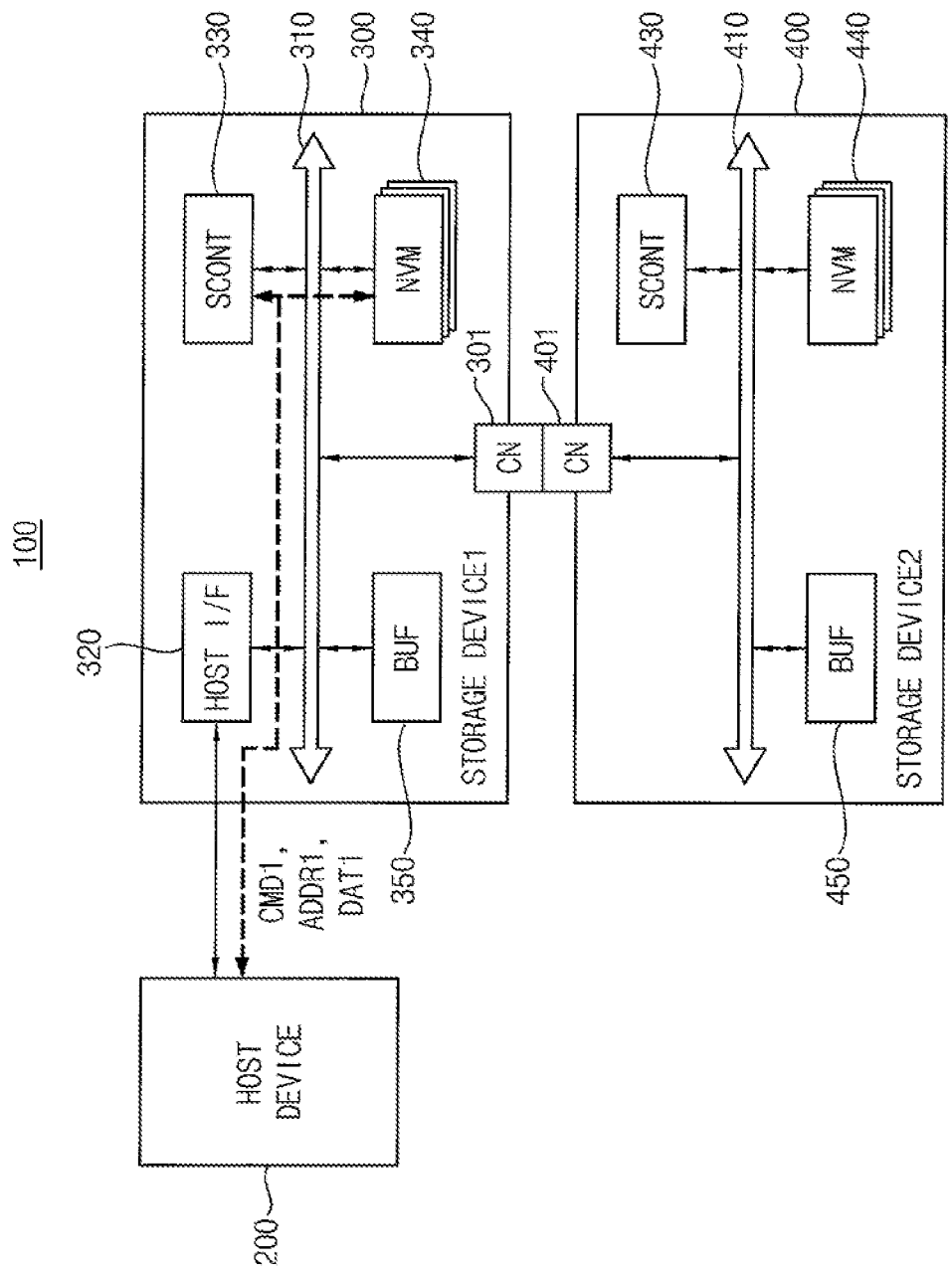

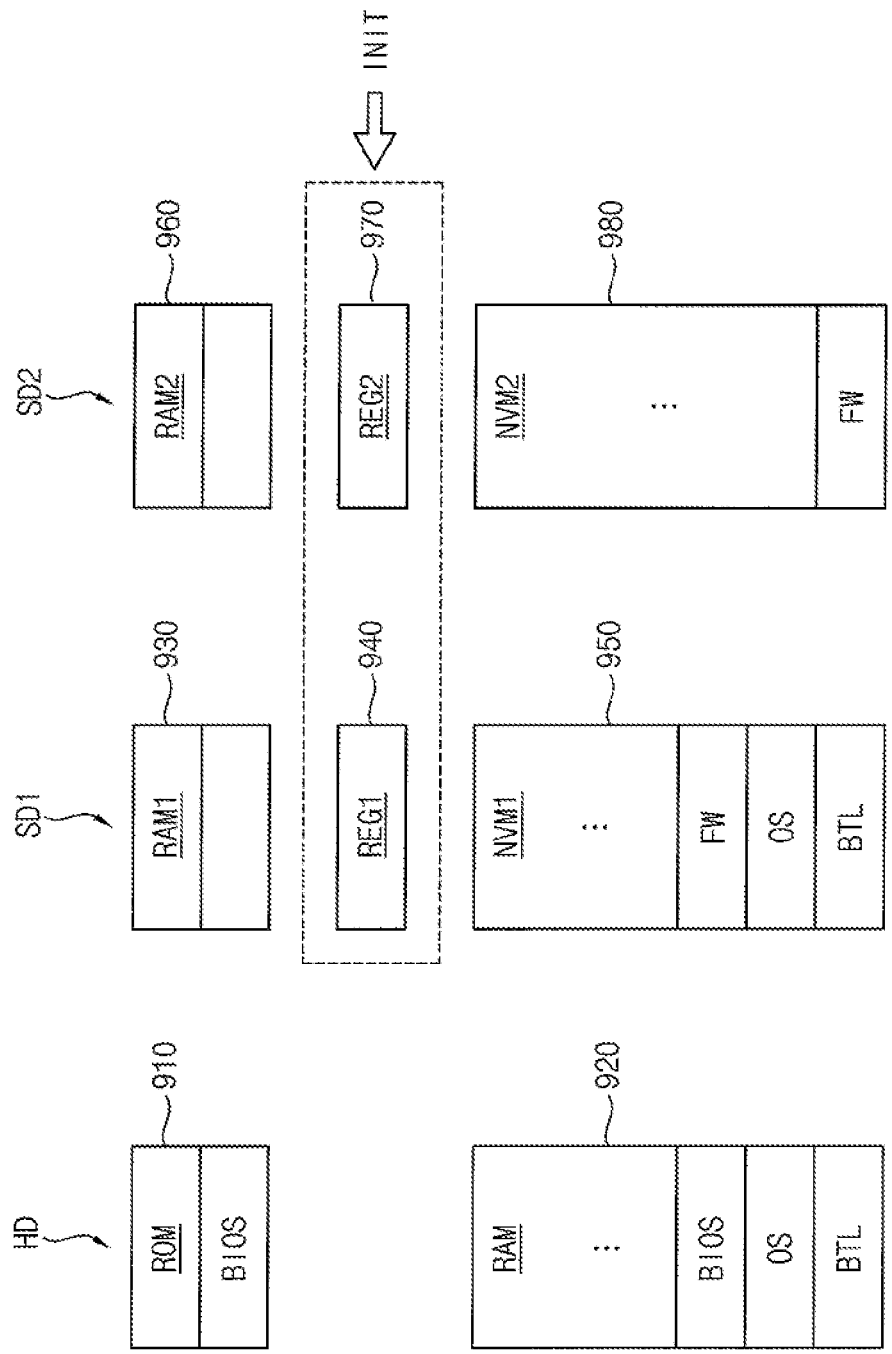

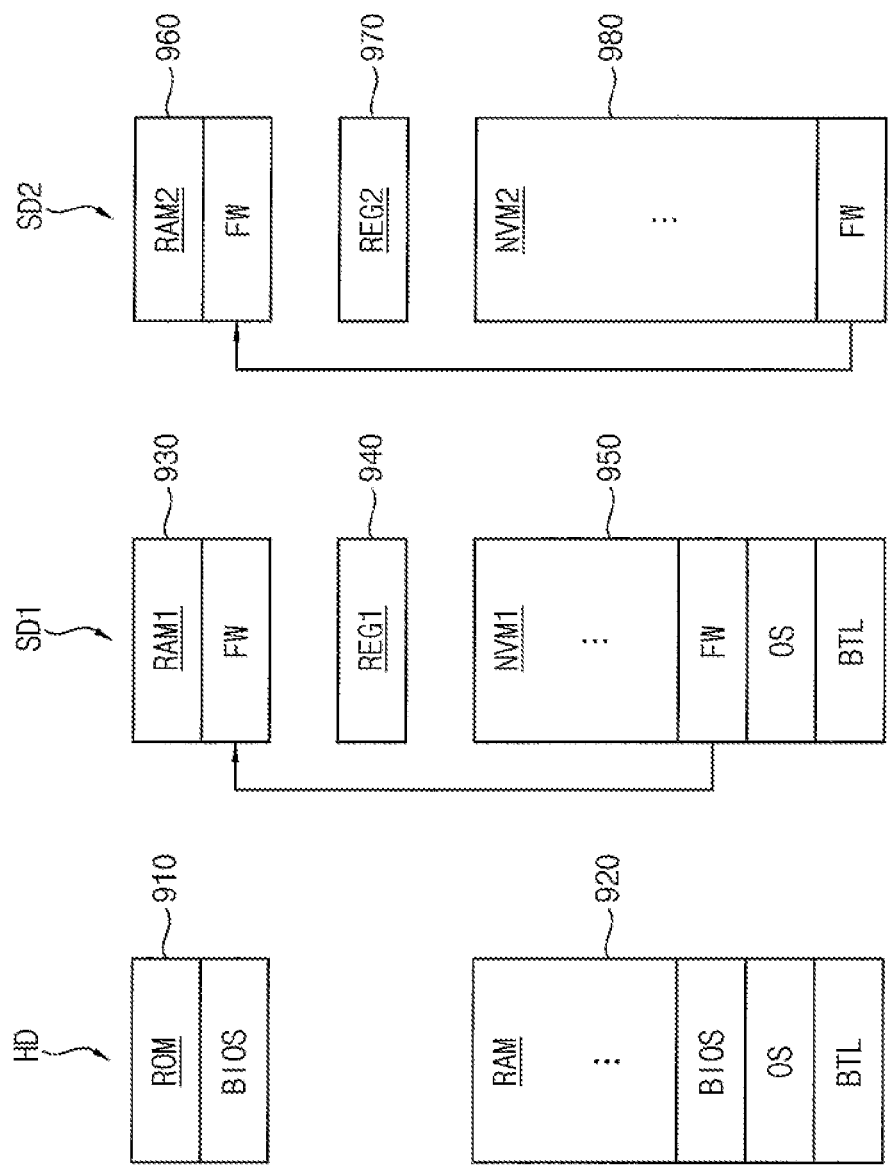

STORAGE SYSTEM WITH CAPACITY SCALABILITY AND METHOD OF OPERATING THE SAME

CROSS-REFERENCE TO RELATED APPLICATION

This application claims priority under 35 USC § 119 to Korean Patent Application No. 10-2020-0077061, filed on Jun. 24, 2020 in the Korean Intellectual Property Office (KIPO), the contents of which are incorporated by reference herein in their entirety.

BACKGROUND

1. Technical Field

Example embodiments relate generally to semiconductor integrated circuits, and more particularly, to storage systems with capacity scalability, and methods of operating the storage systems.

2. Description of the Related Art

Electronic devices such as computers, tablets, and smartphones may contain one or more storage devices. Storage devices retain digital data, such as images, videos, and documents. Storage devices include one or more semiconductor memory devices. Certain types of data storage devices include one or more semiconductor memory devices. Examples of such data storage devices include solid state drives (SSDs). These types of data storage devices may have various design and/or performance advantages over types of storage devices such as hard disk drives (HDDs). Examples of potential advantages include the absence of moving mechanical parts, higher data access speeds, stability, durability, and/or low power consumption. Various systems (e.g., a laptop computer, a car, an airplane, a drone, etc.) have adopted SSDs for data storage.

In a conventional storage system, a storage device may be replaced, or an electronic device as a whole may be replaced, if a capacity of the storage device is insufficient (e.g., in order to increase the storage capacity). In some examples, storage devices may be physically removed from the electronic device and replaced with a new, unused storage device. Such may result in long replacement times, possible risks of damaging the electronic device, and having to reinstall the software, among other inconveniences. Therefore, there is a need in the art for improved systems and methods for replacing or upgrading a storage device.

SUMMARY

At least one example embodiment of the present disclosure provides a storage system including a module-type storage device capable of efficiently increasing a capacity. At least one example embodiment of the present disclosure provides a method of operating the storage system including the module-type storage device.

According to example embodiments, a storage system includes a first storage device (e.g., a main storage device) and a second storage device (e.g., one or more sub storage devices). The first storage device has a first capacity, is directly connected to a host device, and includes a host interface for communicating with the host device. The second storage device has a second capacity, is directly connected to the first storage device, and is configured to communicate with the host device through the host interface included in the first storage device. The capacity of the storage system is a sum of the first capacity of the first storage device and the second capacity of the second storage device.

According to example embodiments, in a method of operating a storage system, a first storage device (e.g., a main storage device) is directly connected with a host device. The first storage device has a first capacity and includes a host interface. A second storage device (e.g., one or more sub storage devices) has a second capacity and is directly connected to the first storage device. The storage system is powered on and a basic input output system (BIOS) stored in the host device is loaded. A boot loader stored in at least one of the first storage device and the second storage device is loaded. A register initialization is performed on the first and second storage devices. It is checked whether the second storage device is connected to the first storage device based on whether a connection confirmation signal is provided to the second storage device and whether a response signal is received from the second storage device. The storage system operates by loading firmware stored in at least one of the first storage device and the second storage device.

According to example embodiments, a storage system includes a host device, a first storage device (e.g., a main storage device) and a second storage device (e.g., one or more sub storage devices). The first storage device has a first capacity and is directly connected to the host device. The second storage device has a second capacity, is directly connected to the first storage device, and is configured to communicate with the host device through the first storage device. The first storage device includes a host interface for communicating with the host device, a first storage controller configured to control an operation of the first storage device, and a first connector configured to form a connection between the first storage device and the second storage device. The second storage device includes a second storage controller configured to control an operation of the second storage device, a plurality of non-volatile memories configured to store data, and a second connector configured to form a connection between the second storage device and the first storage device. When the storage system is powered on, a basic input output system (BIOS) stored in the host device is loaded, a boot loader stored in at least one of the first and second storage devices is loaded, a register initialization is performed on the first and second storage devices, the second storage device connection is checked based on whether a connection confirmation signal is provided to the second storage device and whether a response signal is received from the second storage device, and the storage system operates by loading a firmware stored in at least one of the first storage device and the second storage device. When the response signal is received, the second storage device is determined to be connected to the first storage device, and a capacity including a sum of the first capacity of the first storage device and the second capacity of the second storage device is notified to the host device as a total capacity of the storage system.

The storage system according to example embodiments may include the module-type storage devices. The module-type storage devices may be divided into a main type (e.g., a main storage device) and a sub type (e.g., a sub storage device). The main storage device may be physically directly connected to the host device to operate, and the sub storage device may be connected to the main storage device to operate. When the capacity of the storage system is insufficient or when it is desirable to increase the capacity, the capacity may be efficiently increased by additionally connecting the sub storage device to the main storage device. Additionally, or alternatively, since the sub storage device does not include a host interface, a manufacturing cost of the sub storage device may be lower than that of the main storage device, and it may be implemented to connect a plurality of sub storage devices to one main storage device. Accordingly, the total capacity of the storage system may be efficiently increased with relatively little time, cost and effort, and the storage system may have excellent capacity scalability or expandability.

BRIEF DESCRIPTION OF THE DRAWINGS

Illustrative, non-limiting example embodiments will be more clearly understood from the following detailed description taken in conjunction with the accompanying drawings.

FIGS. 3, 4A and 4B are diagrams for describing an operation of the storage system of FIG. 1.

FIGS. 9A, 9B and 9C are diagrams for describing a method of operating a storage system according to example embodiments.

DETAILED DESCRIPTION OF THE EMBODIMENTS

Figure 1:
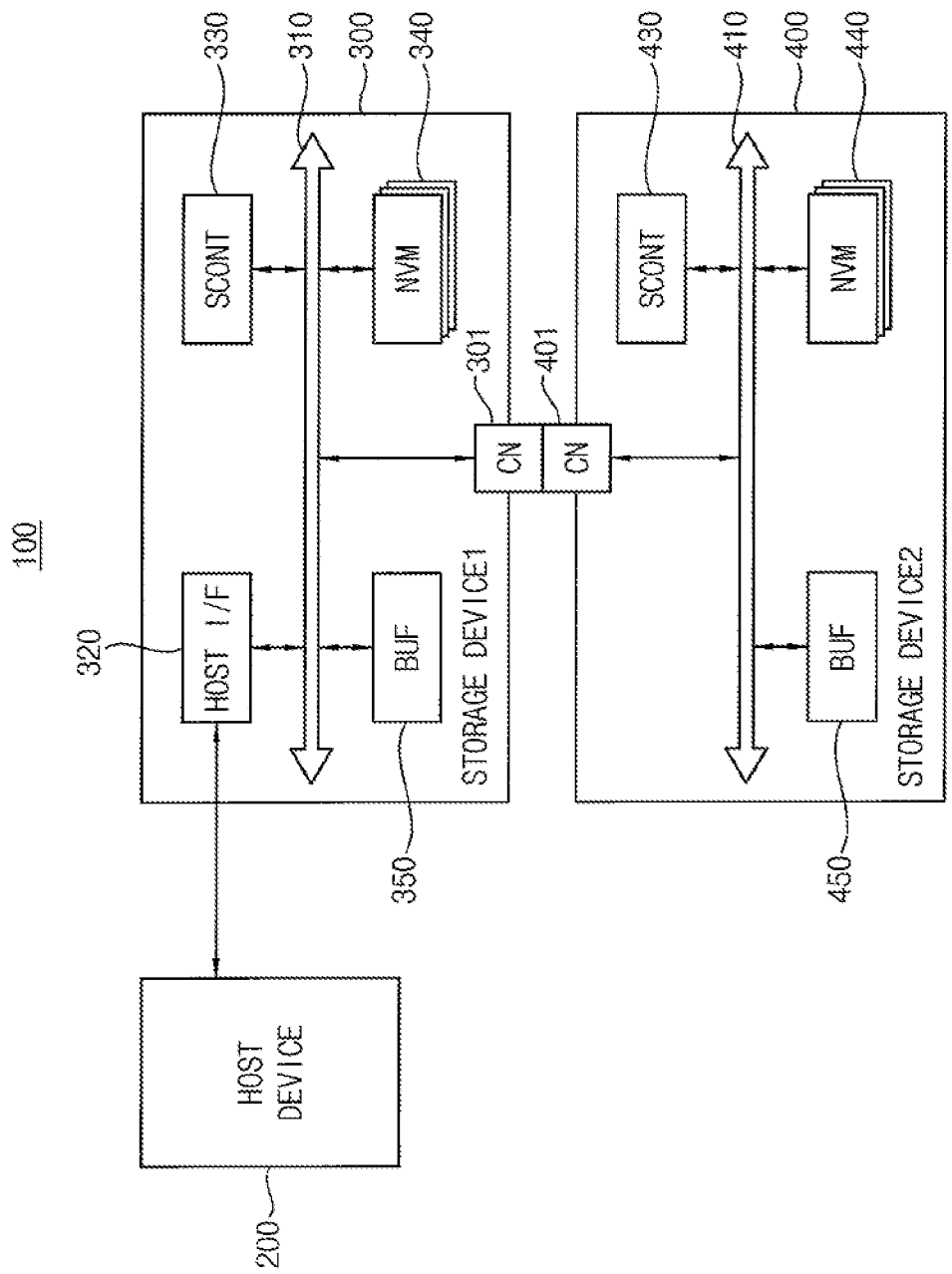
FIG. 1 is a diagram illustrating a storage system according to example embodiments.

Electronic devices such as computers, tablets, and smartphones may contain one or more storage devices. Storage devices retain digital data, such as images, videos, and documents. Storage devices include one or more semiconductor memory devices. Certain types of data storage devices include one or more semiconductor memory devices. Examples of such data storage devices include solid state drives (SSDs). These types of data storage devices may have various design and/or performance advantages over types of storage devices such as hard disk drives (HDDs). Examples of potential advantages include the absence of moving mechanical parts, higher data access speeds, stability, durability, and/or low power consumption. Various systems (e.g., a laptop computer, a car, an airplane, a drone, etc.) have adopted SSDs for data storage.

In a conventional storage system, a storage device may be replaced, or an electronic device as a whole may be replaced, if a capacity of the storage device is insufficient (e.g., in order to increase the storage capacity). In some examples, storage devices may be physically removed from the electronic device and replaced with a new, unused storage device. Such may result in long replacement times, possible risks of damaging the electronic device, and having to reinstall the software, among other inconveniences. In addition, when connecting an additional storage device while maintaining the existing connected storage device as it is, an interface device for connecting the additional storage device is required. Therefore, there is a need in the art for improved systems and methods for replacing or upgrading a storage device without removing the entire storage device from an electronic device.

The present disclosure relates generally to semiconductor integrated circuits, and more particularly, to storage systems with capacity scalability, and methods of operating the storage systems. In some embodiments, the present disclosure includes more than one storage device (e.g., modular storage devices) and simpler storage device replacement processes.

The techniques described herein provide for storage systems with module-type storage devices. The module-type storage devices may be divided into a main type (e.g., a main storage device) and a sub type (e.g., a sub storage device). The main storage device may be physically (e.g., directly) connected to a host device, and sub storage devices may be connected to the main storage device to operate as additional storage capacity. As such, when the capacity of the storage system is insufficient, when it is desirable to increase the capacity, etc., the capacity may be efficiently increased by additionally connecting one or more sub storage devices to the main storage device. Thus, there is no need to replace the previously connected storage device (e.g., the main storage device directly connected to the host). Moreover, additional interfaces for connecting any additional sub storage devices to the host device may not be required. Since sub storage devices do not include a host interface, manufacturing costs such sub storage devices may be reduced (e.g., less than manufacturing costs of main storage devices).

In some embodiments, a plurality of sub storage devices may be connected to one main storage device. In some embodiments, when storage is full, a sub storage device may be removed without removing the main storage device, a larger capacity sub storage device may be added, additional sub storage devices may be added, etc. The storage system may have a storage capacity of a sum of the capacity of the main storage device and the capacity of any additional sub storage devices connected to the main storage device. Accordingly, the total capacity of a storage system may be efficiently increased with relatively little time, cost and effort, and the storage system may have improved capacity scalability and expandability.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a diagram illustrating a storage system according to example embodiments.

Referring to FIG. 1, a storage system 100 includes a host device 200, a first storage device 300, and a second storage device 400.

The host device 200 controls the overall operations of the storage system 100. As will be described with reference to FIG. 5, the host device 200 may include a processor, a memory, etc. The processor may control one or more operations of the host device 200. For example, the processor may execute an operating system (OS). The memory may store instructions and/or data that may be executed and/or processed by the processor. For example, the operating system executed by the processor may include a file system for file management and a device driver for controlling peripheral devices with the storage devices 300 and 400 at the operating system level.

The first storage device 300 is accessed by the host device 200. The first storage device 300 is directly connected to the host device 200, and has a first capacity. The first storage device 300 may include a first connector 301, a first bus 310, a host interface (HOST I/F) 320, a first storage controller (SCONT) 330, a plurality of first non-volatile memories (NVM) 340, and a first buffer memory (BUF) 350.

The first connector 301 may be a component for a connection with the second storage device 400. For example, the first storage device 300 may be directly connected to the second storage device 400 through the first connector 301. Example structures of the first connector 301 will be described with reference to FIGS. 2A and 2B.

The first bus 310 may be connected to the first connector 301, the host interface 320, the first storage controller 330, the plurality of first non-volatile memories 340, and the first buffer memory 350 included in the first storage device 300. Additionally or alternatively, the first bus 310 may include some or all transmission paths for transmitting signals between such components. For example, the first bus 310 may include an address bus, a control bus, a data bus, or the like.

The host interface 320 may be a component for communicating with the host device 200. The first storage device 300 may directly communicate with the host device 200 through the host interface 320.

The first storage controller 330 may control an operation of the first storage device 300 and/or operations of the plurality of first non-volatile memories 340 based on a command, an address, and data received from the host device 200.

The plurality of first non-volatile memories 340 may store a plurality of data. For example, the plurality of first non-volatile memories 340 may store metadata, various user data, or the like.

Examples of the storage devices (e.g., memory devices) described herein may generally include random access memory (RAM), read-only memory (ROM), or a hard disk. Examples of storage devices include solid state memory and a hard disk drive. In some examples, storage devices are used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some cases, examples of the storage devices described herein may include flash memory. Flash memory is an electronic (solid-state) non-volatile computer storage medium that can be electrically erased and reprogrammed. The two main types of flash memory are named after the NAND and NOR logic gates. The individual flash memory cells exhibit internal characteristics similar to those of the corresponding gates. Where EPROMs had to be completely erased before being rewritten, NAND-type flash memory may be written and read in blocks (or pages) which are generally much smaller than the entire device. NOR-type flash allows a single machine word (byte) to be written—to an erased location—or read independently. The NAND type operates primarily in memory cards, USB flash drives, solid-state drives (those produced in 2009 or later), and similar products, for general storage and transfer of data. NAND or NOR flash memory is also often used to store configuration data in numerous digital products, a task previously made possible by EEPROM or battery-powered static RAM. One key disadvantage of flash memory is that it can only endure a relatively small number of write cycles in a specific block. Example applications of both types of flash memory include personal computers, PDAs, digital audio players, digital cameras, mobile phones, synthesizers, video games, scientific instrumentation, industrial robotics, and medical electronics. In addition to being non-volatile, flash memory offers fast read access times, although not as fast as static RAM or ROM. Its mechanical shock resistance helps explain its popularity over hard disks in portable devices, as does its high durability, ability to withstand high pressure, temperature and immersion in water, etc.

Although flash memory is technically a type of EEPROM, the term "EEPROM" is generally used to refer specifically to non-flash EEPROM which is erasable in small blocks, typically bytes. Because erase cycles are slow, the large block sizes used in flash memory erasing give it a significant speed advantage over non-flash EEPROM when writing large amounts of data. Flash memory costs less than byte-programmable EEPROM and had become the dominant memory type wherever a system required a significant amount of non-volatile solid-state storage. Flash memory stores information in an array of memory cells made from floating-gate transistors. In single-level cell (SLC) devices, each cell stores only one bit of information. In multi-level cell (MLC) devices, including triple-level cell (TLC) devices, can store more than one bit per cell. The floating gate may be conductive or non-conductive. In NOR flash, each cell has one end connected directly to ground, and the other end connected directly to a bit line. This arrangement is called "NOR flash" because it acts like a NOR gate: when one of the word lines is brought high, the corresponding storage transistor acts to pull the output bit line low. NAND flash also uses floating-gate transistors, but they are connected in a way that resembles a NAND gate: several transistors are connected in series, and the bit line is pulled low only if all the word lines are pulled high. These groups are then connected via some additional transistors to a NOR-style bit line array in the same way that single transistors are linked in NOR flash. Compared to NOR flash, replacing single transistors with serial-linked groups adds an extra level of addressing.

In some example embodiments, each of the plurality of first non-volatile memories 340 may include a NAND flash memory. In other example embodiments, each of the plurality of first non-volatile memories 340 may include one of an electrically erasable programmable read-only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The first buffer memory 350 may store instructions and/or data executed and/or processed by the first storage controller 330. Additionally or alternatively, the first buffer memory 350 may temporarily store data stored in or to be stored into the plurality of first non-volatile memories 340. For example, the first buffer memory 350 may include at least one of various volatile memories, e.g., a dynamic random access memory (DRAM), or the like.

The second storage device 400 is accessed by the host device 200. The second storage device 400 is directly connected (e.g., without intermediate hardware or components other than connection components) to the first storage device 300, and has a second capacity. The second storage device 400 may include a second connector 401, a second bus 410, a second storage controller 430, a plurality of second non-volatile memories 440, and a second buffer memory 450.

The second storage device 400 may be substantially the same as the first storage device 300, except that the second storage device 400 does not include the host interface 320. Therefore, the repeated descriptions will be omitted.

The second connector 401 may be a component for a connection with the first storage device 300. For example, the second storage device 400 may be directly connected to the first storage device 300 through the second connector 401. Example structures of the second connector 401 will be described with reference to FIGS. 2A and 2B.

The second storage device 400 may not be directly connected to the host device 200 and may not include the host interface 320. Therefore, the second storage device 400 may communicate with the host device 200 through the first storage device 300. For example, the second storage device 400 may communicate with the host device 200 through the host interface 320 included in the first storage device 300.

A host interface 320 may manage input and output signals for a host device 200. A host interface 320 may also manage peripherals not integrated into a host device 200. In some cases, a host interface 320 may represent a physical connection or port to an external peripheral. In some cases, a host interface 320 may utilize an operating system such as iOS®, ANDROID®, MS-DOS®, MS-WINDOWS®, OS/2®, UNIX®, LINUX®, or another known operating system. In other cases, a host interface 320 may represent or interact with a modem, a keyboard, a mouse, a touchscreen, or a similar device. In some cases, a host interface 320 may be implemented as part of a processor. In some cases, first storage device 300 may interact with a host device 200 via a host interface 320 or via hardware components controlled by a host interface 320.

The second bus 410 may be connected to the second connector 401, the second storage controller 430, the plurality of second non-volatile memories 440, and the second buffer memory 450 included in the second storage device 400. The second storage controller 430 may control an operation of the second storage device 400 and/or operations of the plurality of second non-volatile memories 440. The plurality of second non-volatile memories 440 may store a plurality of data. The second buffer memory 450 may store instructions and/or data executed and/or processed by the second storage controller 430. Additionally or alternatively, the second buffer memory 450 may temporarily store data stored in or to be stored into the plurality of second non-volatile memories 440.

The first and second storage devices 300 and 400 included in the storage system 100, according to example embodiments, may be implemented in the form of a module-type storage device. For example, the first storage device 300 directly connected to the host device 200 may include the host interface 320 and may operate as a main storage device. The second storage device 400 not directly connected to the host device 200 and directly connected to the first storage device 300 may not include the host interface 320 and may operate as a sub storage device. Additionally, or alternatively, the first and second storage devices 300 and 400 may include the first and second connectors 301 and 401 for an electrical connection therebetween. Therefore, attaching the second storage device 400 to the first storage device 300 and/or detaching the second storage device 400 from the first storage device 300 may be performed. When the first and second storage devices 300 and 400 are directly connected to each other by the first and second connectors 301 and 401, the storage system 100 may have a total capacity of a sum of the first capacity of the first storage device 300 and the second capacity of the second storage device 400.

In some example embodiments, each of the first and second storage devices 300 and 400 may be a solid state drive (SSD). In other example embodiments, each of the first and second storage devices 300 and 400 may be a universal flash storage (UFS), a multimedia card (MMC) or an embedded multimedia card (eMMC). In still other example embodiments, each of the first and second storage devices 300 and 400 may be one of a secure digital (SD) card, a micro SD card, a memory stick, a chip card, a universal serial bus (USB) card, a smart card, a compact flash (CF) card, or the like In some example embodiments, the host interface 320 may support one of an advanced technology attachment (ATA) interface, a serial ATA (SATA) interface, a parallel ATA (PATA) interface, a peripheral component interconnect express (PCIe) interface, a serial attached small computer system (SAS) interface, a small computer system interface (SCSI), a universal serial bus (USB) interface, a non-volatile memory express (NVMe) interface, an eMMC interface, and a UFS interface. Additionally, or alternatively, the host interface 320 may be a block accessible interface, and the storage devices 300 and 400 may be connected to the host device 200 through the block accessible interface. The storage devices 300 and 400 may use a block accessible address space corresponding to an access size of the non-volatile memories 340 and 440 to provide the block accessible interface to the host device 200, for access by units of a memory block with respect to data stored in the non-volatile memories 340 and 440.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The storage system 100, according to example embodiments, may include the module-type storage devices. The module-type storage devices may be divided into a main type (e.g., a main storage device) and a sub type (e.g., a sub storage device). The main storage device may be physically directly connected to the host device 200 to operate, and the sub storage device may be connected to the main storage device to operate. When the capacity of the storage system is insufficient and the capacity is to be increased, the capacity may be efficiently increased by additionally connecting the sub storage device to the main storage device. Therefore, there is no need to replace the previously connected storage device, and an additional interface for connecting an additional storage device to the host device 200 may not be required. Additionally, or alternatively, since the sub storage device does not include a host interface, a manufacturing cost of the sub storage device may be lower than that of the main storage device. The sub storage device may be implemented to connect a plurality of sub storage devices to one main storage device. Accordingly, the total capacity of the storage system 100 may be efficiently increased with relatively little time, cost and effort, and the storage system 100 may have excellent capacity scalability or expandability.

Figure 2A:
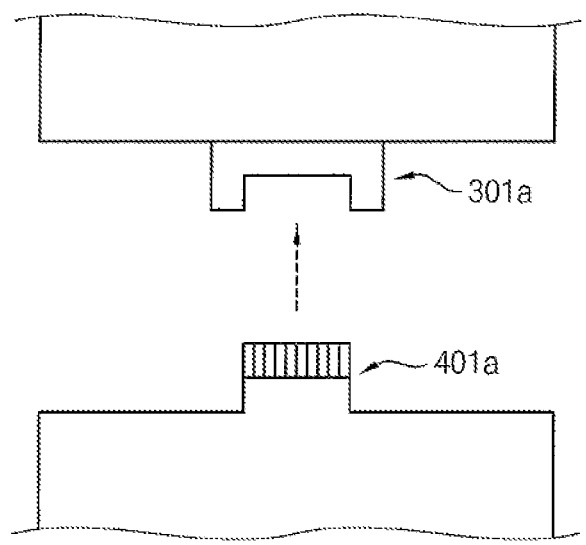
FIGS. 2A and 2B are diagrams illustrating examples of a connection between storage devices included in a storage system according to example embodiments.
Figure 2B:
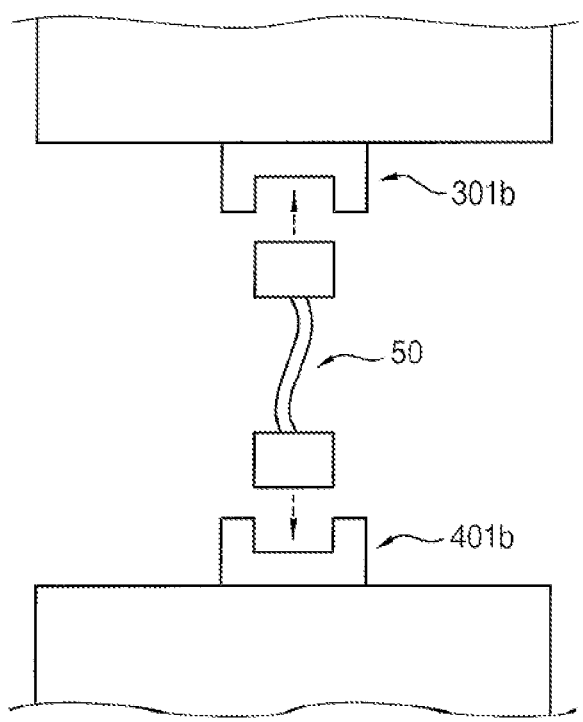

FIGS. 2A and 2B are diagrams illustrating examples of a connection between storage devices included in a storage system according to example embodiments.

Referring to FIG. 2A, a first connector 301*a* included in a first storage device (e.g., the first storage device 300 in FIG. 1) and a second connector 401*a* included in a second storage device (e.g., the second storage device 400 in FIG. 1) may be directly connected to each other. Therefore, a first bus (e.g., the first bus 310 in FIG. 1) included in the first storage device and a second bus (e.g., the second bus 410 in FIG. 1) included in the second storage device may be electrically connected to each other. For example, the first connector 301*a* may be a socket or may have a concave structure (or a groove structure). The second connector 401*a* may be a terminal or may have a protrusion structure corresponding to a shape of the first connector 301*a*. The first and second connectors 301*a* and 401*a* may include electrical pins or pads. For example, the pins or pads may be contact pads or contact pins, but example embodiments are not limited thereto.

Referring to FIG. 2B, a first connector 301*b* included in a first storage device (e.g., the first storage device 300 in FIG. 1) and a second connector 401*b* included in a second storage device (e.g., the second storage device 400 in FIG. 1) may be connected to each other through a wired cable 50. Therefore, a first bus (e.g., the first bus 310 in FIG. 1) included in the first storage device and a second bus (e.g., the second bus 410 in FIG. 1) included in the second storage device may be electrically connected to each other. For example, each of the first connector 301*b* and the second connector 401*b* may be a socket or may have a concave structure corresponding to a shape of the wired cable 50.

Although the example structures of the first connectors 301*a* and 301*b* and the second connectors 401*a* and 401*b* are described with reference to FIGS. 2A and 2B, example embodiments are not limited thereto. The first and second connectors may have at least one of various structures for implementing the module-type storage device, e.g., for directly connecting the first and second storage devices 300 and 400 to each other and for electrically connecting the first and second buses 310 and 410 to each other.

Figure 3:
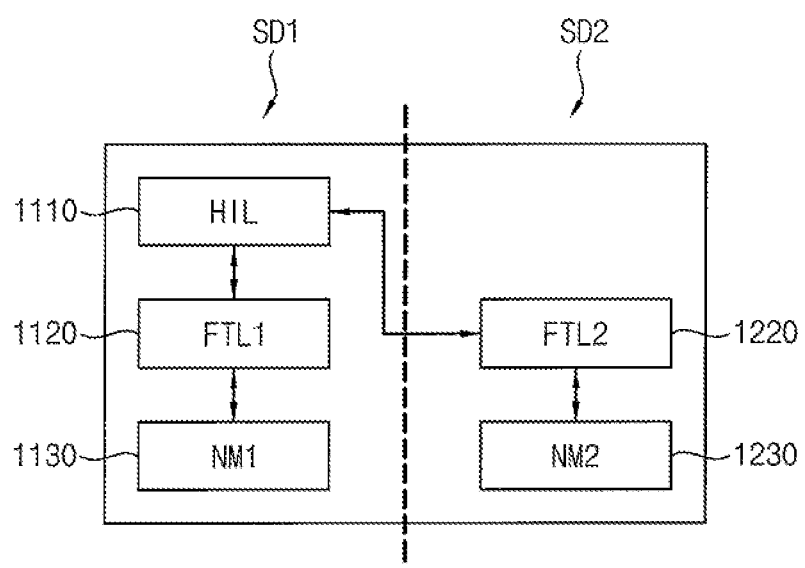
Figure 4B:
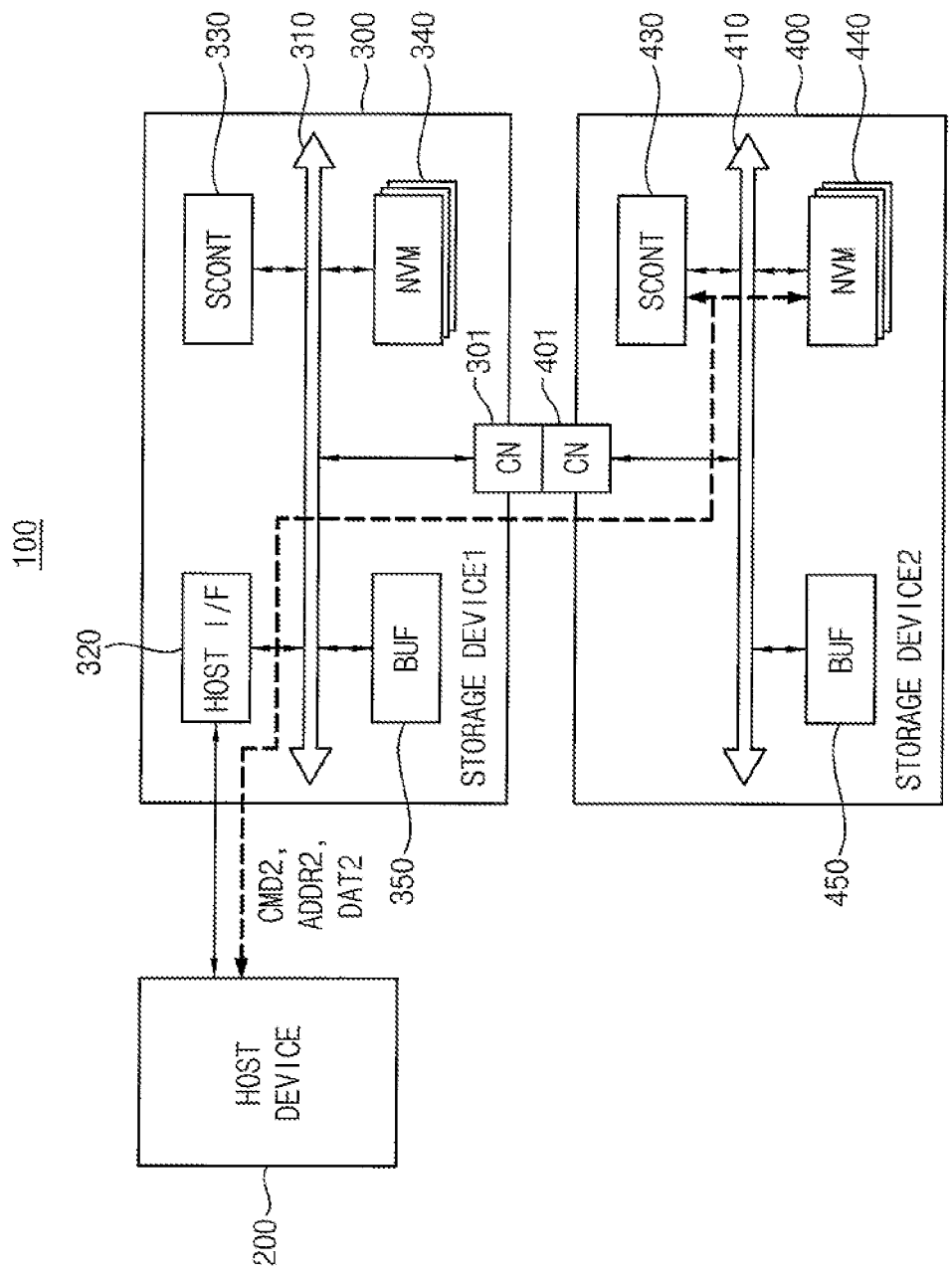

FIGS. 3, 4A and 4B are diagrams for describing an operation of the storage system of FIG. 1.

Referring to FIG. 3, a hierarchical structure of software executed by the storage system 100 of FIG. 1 is illustrated. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

A first storage device SD1 and a second storage device SD2 may correspond to the first storage device 300 and the second storage device 400 in FIG. 1, respectively. As described with reference to FIG. 1, the first storage device SD1 and the second storage device SD2 may be physically separate components. However, when the first storage device SD1 and the second storage device SD2 are connected to each other, the first storage device SD1 and the second storage device SD2 may operate as one storage device.

A first storage controller (e.g., the first storage controller 330 in FIG. 1) included in the first storage device SD1 may execute a host interface layer (HIL) 1110 based on a host interface (e.g., the host interface 320 in FIG. 1). The first storage controller 330 may execute a first flash translation layer (or flash transaction layer, FTL) (FTL1) 1120 and a first non-volatile memory manager (or NAND manager, NM) (NM1) 1130 based on a control of the host interface layer 1110, and may access a plurality of first non-volatile memories (e.g., the plurality of first non-volatile memories 340 in FIG. 1).

Similarly, a second storage controller (e.g., the second storage controller 430 in FIG. 1) included in the second storage device SD2 may execute a second flash translation layer (FTL2) 1220 and a second non-volatile memory manager (NM2) 1230 based on a control of the host interface layer 1110, and may access a plurality of second non-volatile memories (e.g., the plurality of second non-volatile memories 440 in FIG. 1). As described with reference to FIG. 1, the second storage device SD2 may not include the host interface 320. Therefore, the second storage device SD2 may not include the host interface layer 1110. The second storage device SD2 may communicate with the host device 200 using the host interface 320 and the host interface layer 1110 in the first storage device SD1.

Referring to FIG. 4A, when the host device 200 wants to access the first storage device 300 (e.g., when the first storage device 300 is to be accessed by the host device 200), the host device 200 and the first storage device 300 may directly exchange a first command CMD1, a first address ADDR1 and first data DAT1. For example, the first command CMD1 and the first address ADDR1 may be transmitted from the host device 200 to the first storage controller 330 through the host interface 320 and the first bus 310. When the first command CMD1 is a write command, the first data DAT1 may be write data, may be transmitted from the host device 200 to the plurality of first non-volatile memories 340 through the host interface 320 and the first bus 310, and may be stored in the plurality of first non-volatile memories 340. When the first command CMD1 is a read command, the first data DAT1 may be read data and transmitted from the plurality of first non-volatile memories 340 to the host device 200 through the first bus 310 and the host interface 320.

Referring to FIG. 4B, when the host device 200 wants to access the second storage device 400 (e.g., when the second storage device 400 is to be accessed by the host device 200), the host device 200 and the second storage device 400 may exchange a second command CMD2, a second address ADDR2 and second data DAT2 through the first storage device 300. For example, the second command CMD2 and the second address ADDR2 may be transmitted from the host device 200 to the second storage controller 430 through the host interface 320, the first bus 310, the first connector 301, the second connector 401 and the second bus 410. When the second command CMD2 is a write command, the second data DAT2 may be write data, may be transmitted from the host device 200 to the plurality of second non-volatile memories 440 through the host interface 320, the first bus 310, the first connector 301, the second connector 401 and the second bus 410, and may be stored in the plurality of second non-volatile memories 440. When the second command CMD2 is a read command, the second data DAT2 may be read data, and may be transmitted from the plurality of second non-volatile memories 440 to the host device 200 through the second bus 410, the second connector 401, the first connector 301, the first bus 310 and the host interface 320.

Figure 5:
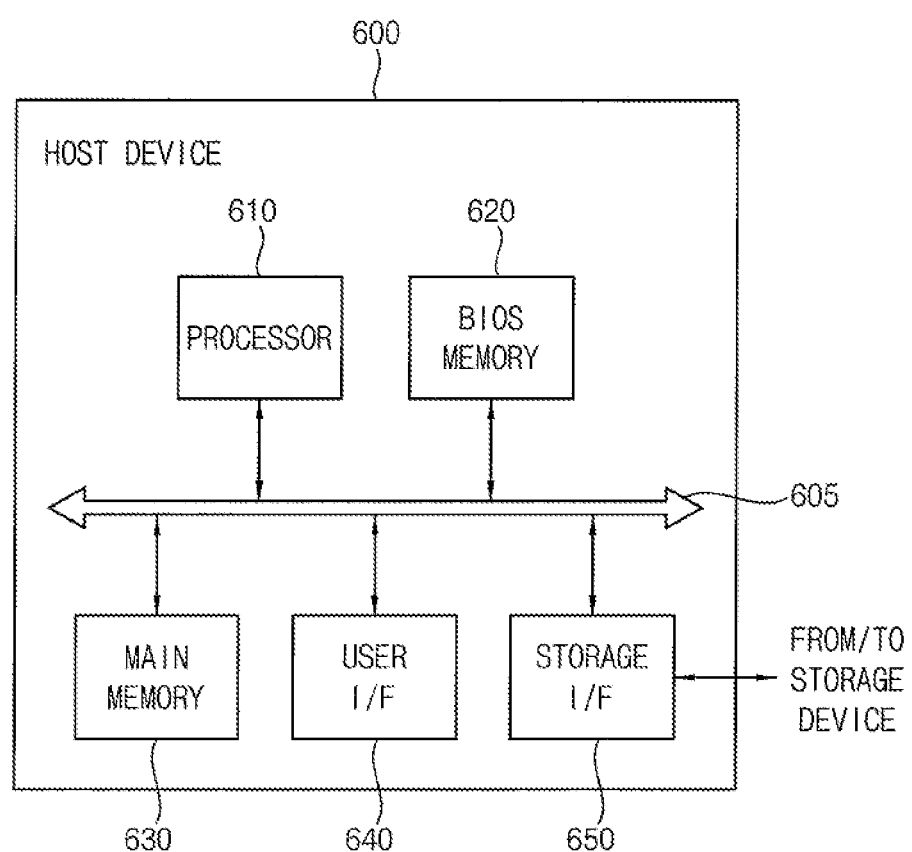
FIG. 5 is a block diagram illustrating an example of a host device included in a storage system according to example embodiments.

FIG. 5 is a block diagram illustrating an example of a host device included in a storage system according to example embodiments.

Referring to FIG. 5, a host device 600 may include a bus 605, a processor 610, a basic input output system (BIOS) memory 620, a main memory 630, a user interface 640 and a storage interface 650. The host device 600 may be controlled by the processor 610, and the host device 600 may be referred to as a computing device.

The processor 610 may control the overall operations of the host device 600. For example, the processor 610 may be a central processing unit (CPU), an application processor (AP), etc. The processor 610 may be connected to and may control the BIOS memory 620, the main memory 630, the user interface 640, and the storage interface 650 through the bus 605. The bus 605 may be regarded as including some or all signal paths for transferring signals between the processor 610, the BIOS memory 620, the main memory 630, the user interface 640 and the storage interface 650. For example, the bus 605 may include an address bus, a control bus, a data bus, etc.

The BIOS memory 620 may store a BIOS. In a broad sense, the BIOS may be a program in the lowest level for controlling hardware among programs established in a computing system. The BIOS may be a kind of firmware with an intermediate form of hardware and software. The BIOS in the BIOS memory 620 may take control of the host device 600 when the host device 600 is powered on to process fundamental functions of the host device 600. For example, when the host device 600 is powered on, the BIOS in the BIOS memory 620 may be loaded to the main memory 630 and the loaded BIOS in the main memory 630 may be executed by the processor 610 to perform initialization of the host device 600. Additionally, or alternatively, various application programs may be stored in the BIOS memory 620. For example, the application programs for supporting storage protocols such as ATA, SATA, PATA, PCIe, SAS, SCSI, USB, NVMe, eMMC, UFS, etc. may be stored in the BIOS memory 620. For example, the BIOS memory 620 may be implemented with an erasable and programmable read-only memory (EPROM). For example, the BIOS memory 620 may be implemented with a flash memory.

The main memory 630 may be a memory for storing data and programs. A boot loader, an OS, and application programs stored in an external storage device (e.g., the storage devices 300 and 400 in FIG. 1) may be loaded to the main memory 630 for prompt access. For example, the main memory 630 may include a volatile memory device such as a dynamic random access memory (DRAM) and a static random access memory SRAM.

The user interface 640 may include physical hardware and/or logical software as a physical medium and/or virtual medium for exchanging information between a user and the hardware and the programs of the host device 600. The user interface 640 may include an input device for operating the host device 600 by the user and an output device for representing processed results of the user input.

The storage interface 650 may include physical hardware and/or logical software for connecting the external storage device to the host device 600. For example, the storage interface 650 may support storage protocols such as ATA, SATA, PATA, PCIe, SAS, SCSI, USB, NVMe, eMMC, UFS, etc.

Figure 6:
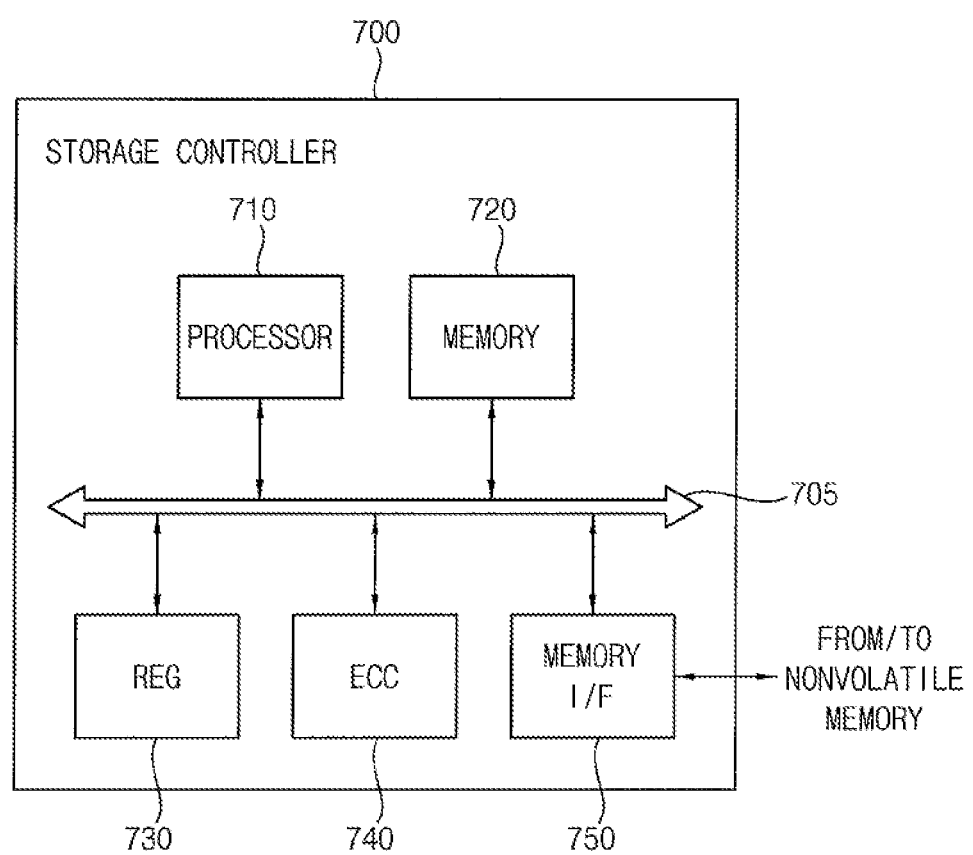
FIG. 6 is a block diagram illustrating an example of a storage controller included in a storage device included in a storage system according to example embodiments.

FIG. 6 is a block diagram illustrating an example of a storage controller included in a storage device included in a storage system according to example embodiments.

Referring to FIG. 6, a storage controller 700 may include a bus 705, at least one processor 710, a memory 720, at least one register (REG) 730, an error correction code (ECC) block 740 and a memory interface 750.

The processor 710 may control an operation of the storage controller 700 in response to a command received from a host device (e.g., the host device 200 in FIG. 1). In some example embodiments, the processor 710 may control respective components by employing firmware for operating a storage device (e.g., the storage devices 300 and 400 in FIG. 1). The processor 710 may be connected to and may control the memory 720, the register 730, the ECC block 740 and the memory interface 750 through the bus 705. The bus 705 may be regarded as including some or all signal paths for transferring signals between the processor 710, the memory 720, the register 730, the ECC block 740 and the memory interface 750. For example, the bus 705 may include an address bus, a control bus, a data bus, etc.

The memory 720 may store instructions and data executed and processed by the processor 710. For example, the memory 720 may be implemented with a volatile memory with relatively small capacity and high speed, such as a SRAM, a cache memory, or the like.

The register 730 may control, set, and monitor various aspects related to functions of the storage controller 700 and/or the storage devices 300 and 400. For example, the register 730 may include a special function register (SFR) or a special purpose register (SPR).

The ECC block 740 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The memory interface 750 may exchange data with non-volatile memories (e.g., the non-volatile memories 340 and 440 in FIG. 1). The memory interface 750 may transfer data to the non-volatile memories 340 and 440, or may receive data read from the non-volatile memories 340 and 440. In some example embodiments, the memory interface 750 may be connected to the non-volatile memories 340 and 440 via one channel. In other example embodiments, the memory interface 750 may be connected to the non-volatile memories 340 and 440 via two or more channels.

Figure 7:
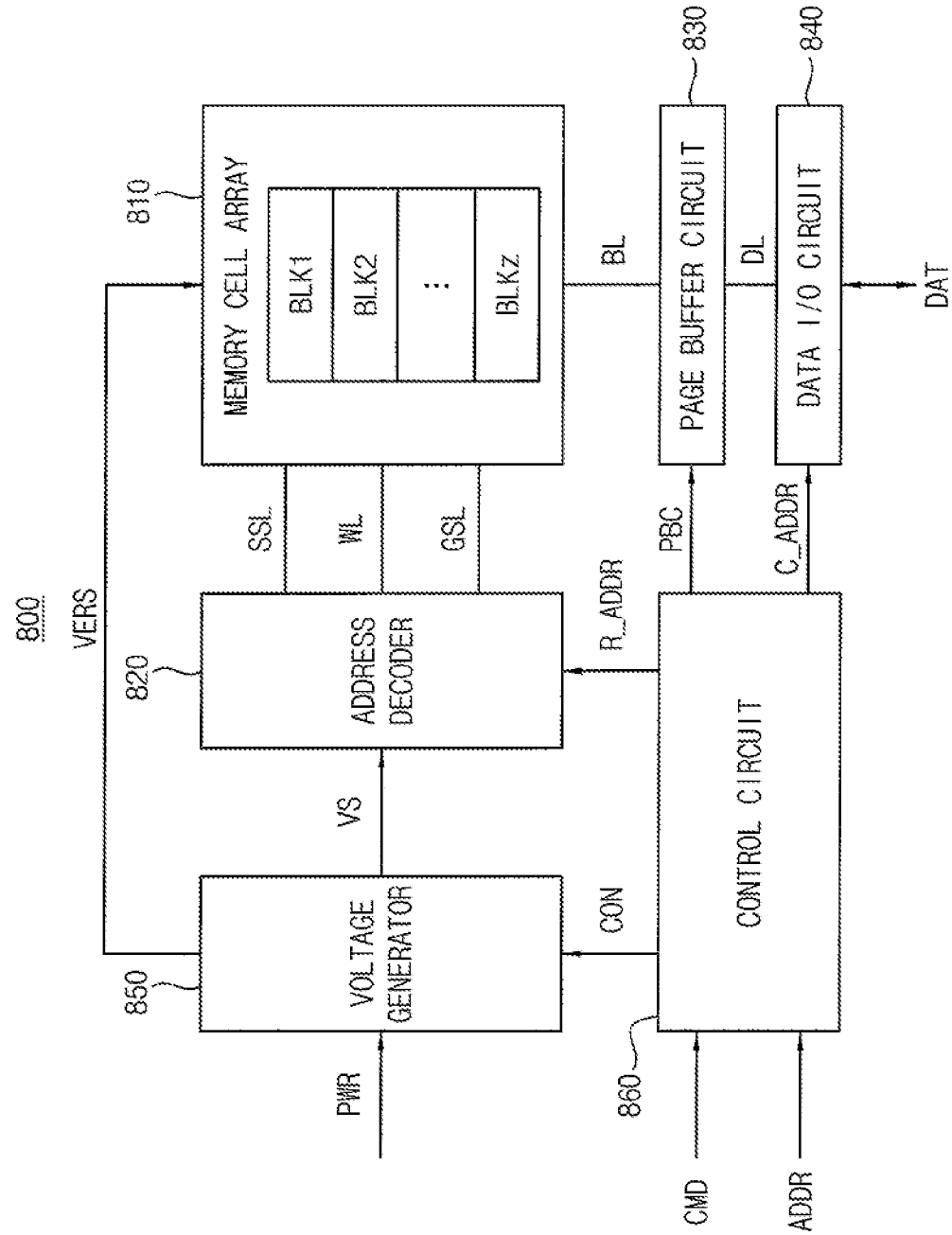
FIG. 7 is a block diagram illustrating an example of a non-volatile memory included in a storage device included in a storage system according to example embodiments.

FIG. 7 is a block diagram illustrating an example of a non-volatile memory included in a storage device included in a storage system according to example embodiments.

Referring to FIG. 7, a non-volatile memory 800 includes a memory cell array 810, an address decoder 820, a page buffer circuit 830, a data input/output (I/O) circuit 840, a voltage generator 850, and a control circuit 860.

The memory cell array 810 is connected to the address decoder 820 via a plurality of string selection lines SSL, a plurality of wordlines WL, and a plurality of ground selection lines GSL. The memory cell array 810 is further connected to the page buffer circuit 830 via a plurality of bitlines BL. The memory cell array 810 may include a plurality of memory cells (e.g., a plurality of non-volatile memory cells) connected to the plurality of wordlines WL and the plurality of bitlines BL. The memory cell array 810 may be divided into a plurality of memory blocks BLK1, BLK2, . . . , BLKz, where each of the plurality of memory blocks includes memory cells. Additionally, or alternatively, each of the plurality of memory blocks BLK1 to BLKz may be divided into a plurality of pages.

In some example embodiments, the plurality of memory cells may be arranged in a two-dimensional (2D) array structure or a three-dimensional (3D) vertical array structure. A three-dimensional vertical array structure may include vertical cell strings that may be vertically oriented such that at least one memory cell is located over another memory cell. The at least one memory cell may comprise a charge trap layer. The following patent documents, which are hereby incorporated by reference in their entirety, describe suitable configurations for a memory cell array with a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 860 receives a command CMD and an address ADDR from the outside (e.g., the host device 200 and/or the storage controllers 330 and 430 in FIG. 1), and control erasure, programming, and read operations of the non-volatile memory 800 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 860 may generate control signals CON, which are used for controlling the voltage generator 850. The control circuit 860 may generate control signal PBC for controlling the page buffer circuit 830, based on the command CMD and may generate a row address R_ADDR and a column address C_ADDR based on the address ADDR. The control circuit 860 may provide the row address R_ADDR to the address decoder 820 and may provide the column address C_ADDR to the data I/O circuit 840.

The address decoder 820 may be connected to the memory cell array 810 via the plurality of string selection lines SSL, the plurality of wordlines WL and the plurality of ground selection lines GSL.

For example, in the data erase/write/read operations, the address decoder 820 may determine at least one of the plurality of wordlines WL as a selected wordline, and may determine the rest or remainder of the plurality of wordlines WL other than the selected wordline as unselected wordlines, based on the row address R_ADDR.

Additionally, or alternatively, in the data erase/write/read operations, the address decoder 820 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 820 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 850 may generate voltages VS for an operation of the non-volatile memory 800 based on a power PWR and the control signals CON. The voltages VS may be applied to the plurality of string selection lines SSL, the plurality of wordlines WL and the plurality of ground selection lines GSL via the address decoder 820. Additionally, or alternatively, the voltage generator 850 may generate an erase voltage VERS for the data erase operation based on the power PWR and the control signals CON. The erase voltage VERS may be applied to the memory cell array 810 directly or via the bitline BL.

For example, during the erase operation, the voltage generator 850 may apply the erase voltage VERS to a common source line and/or the bitline BL of a memory block (e.g., a selected memory block) and may apply an erase permission voltage (e.g., a ground voltage) to some or all wordlines of the memory block or a portion of the wordlines via the address decoder 820. Additionally, or alternatively, during the erase verification operation, the voltage generator 850 may apply an erase verification voltage simultaneously to some or all wordlines of the memory block or sequentially to the wordlines one by one.

For example, during the program operation, the voltage generator 850 may apply a program voltage to the selected wordline and may apply a program pass voltage to the unselected wordlines via the address decoder 820. Additionally, or alternatively, during the program verification operation, the voltage generator 850 may apply a program verification voltage to the selected wordline and may apply a verification pass voltage to the unselected wordlines via the address decoder 820.

Additionally, or alternatively, during the normal read operation, the voltage generator 850 may apply a read voltage to the selected wordline and may apply a read pass voltage to the unselected wordlines via the address decoder 820. During the data recover read operation, the voltage generator 850 may apply the read voltage to a wordline adjacent to the selected wordline and may apply a recover read voltage to the selected wordline via the address decoder 820.

The page buffer circuit 830 may be connected to the memory cell array 810 via the plurality of bitlines BL. The page buffer circuit 830 may include a plurality of page buffers. In some example embodiments, each page buffer may be connected to one bitline. In other example embodiments, each page buffer may be connected to two or more bitlines.

The page buffer circuit 830 may store data DAT to be programmed into the memory cell array 810 or may read data DAT sensed from the memory cell array 810. In other words, the page buffer circuit 830 may operate as a write driver or a sensing amplifier according to an operation mode of the non-volatile memory 800.

The data I/O circuit 840 may be connected to the page buffer circuit 830 via data lines DL. The data I/O circuit 840 may provide the data DAT from outside of the non-volatile memory 800 to the memory cell array 810 via the page buffer circuit 830 or may provide the data DAT from the memory cell array 810 to the outside of the non-volatile memory 800, based on the column address C_ADDR.

Figure 8:
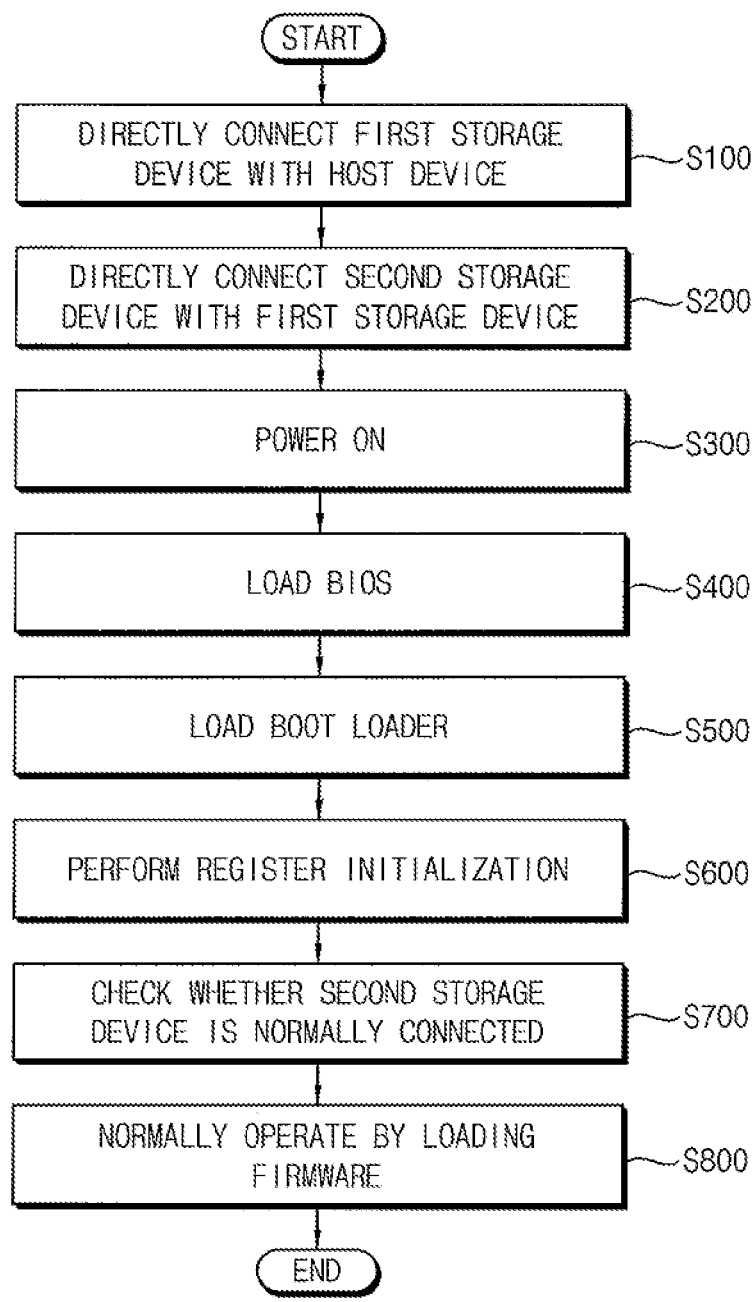
FIG. 8 is a flowchart illustrating a method of operating a storage system according to example embodiments.
Figure 9A:
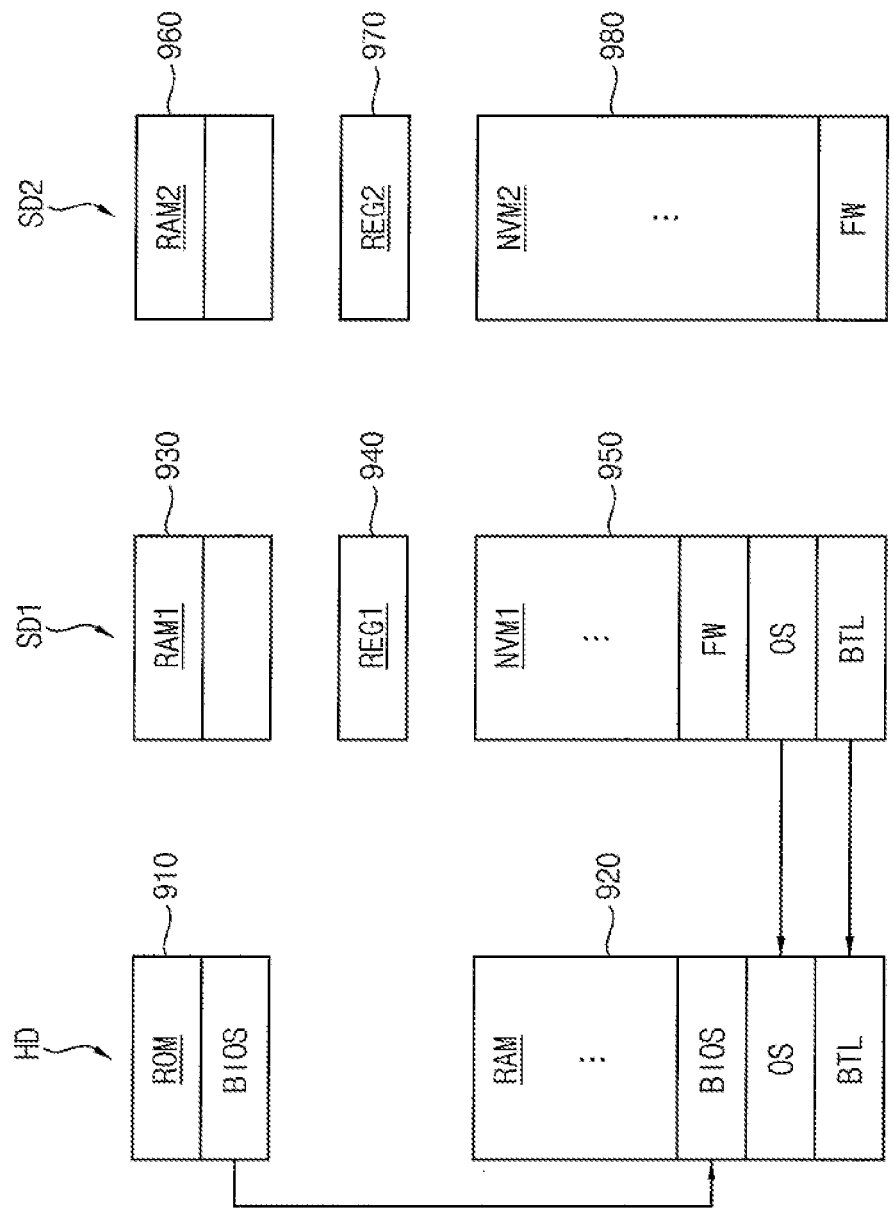

FIG. 8 is a flowchart illustrating a method of operating a storage system according to example embodiments. FIGS. 9A, 9B, and 9C are diagrams for describing a method of operating a storage system according to example embodiments.

In FIGS. 9A, 9B, and 9C, a host device HD, a first storage device SD1 and a second storage device SD2 may correspond to the host device 200, the first storage device 300 and the second storage device 400 in FIG. 1, respectively. A BIOS memory (ROM) 910 and a main memory (RAM) 920 included in the host device HD may correspond to the BIOS memory 620 and the main memory 630 included in the host device 600 of FIG. 5, respectively. A first buffer memory (RAM1) 930, a first non-volatile memory (NVM1) 950 and a second buffer memory (RAM2) 960 and a second non-volatile memory (NVM2) 980 included in the first storage device SD1 and the second storage device SD2 may correspond to the first buffer memory 350, the plurality of first non-volatile memories 340, the second buffer memory 450 and the plurality of second non-volatile memories 440 in FIG. 1, respectively. Each of a first register (REG1) 940 and a second register (REG2) 970 included in the first storage device SD1 and the second storage device SD2 may correspond to the register 730 included in the storage controller 700 of FIG. 6.

Referring to FIGS. 8, 9A, 9B and 9C, in a method of operating a storage system according to example embodiments, a first storage device with a first capacity and including a host interface (e.g., the host interface 320 in FIG. 1) is directly connected with a host device (step S100). A second storage device with a second capacity is directly connected with the first storage device (step S200). As described with reference to FIGS. 1, 2A and 2B, each of the first and second storage devices SD1 and SD2 may be implemented in the form of the module-type storage device, and the first and second storage devices SD1 and SD2 may be connected to each other using connectors (e.g., the first and second connectors 301 and 401 in FIG. 1). When the first and second storage devices SD1 and SD2 are already connected to each other, steps S100 and S200 may be omitted.

Next, the storage system is powered on (step S300), a BIOS stored in the host device is loaded (step S400), and a boot loader stored in at least one of the first and second storage devices is loaded (step S500). For example, as illustrated in FIG. 9A, when power is applied to the storage system, a BIOS stored in the BIOS memory 910 of the host device HD may be loaded into the main memory 920 of the host device HD, and an operating system OS and a boot loader BTL stored in the first storage device SD1 may be loaded into the main memory 920 of the host device HD. However, example embodiments are not limited thereto, and the operating system OS and the boot loader BTL may be stored in the second storage device SD2.

When the storage system is switched on, the power may be provided to the hardware such as the host device HD, the first and second storage devices SD1 and SD2, etc., and power-on self-test (POST) may be performed by the BIOS. After the power-on self-test is completed, the BIOS may scan a predetermined list of storage devices, for example, a boot device sequence, until a bootable device is found. The BIOS may determine the bootable device and may load a boot sector from the determined bootable device to the main memory 920. The boot sector may include information about how partitions are organized in the storage medium of the bootable device. Additionally, or alternatively, the boot sector may include an executable code, which is referred to as the boot loader BTL, for loading the operating system OS. The operating system OS may be loaded from the bootable device to the main memory 920 by the boot loader BTL. After system configuration files are loaded to the main memory 920 by the loaded operating system OS, the operating system OS may execute initial instructions and then may wait for an instruction from the user.

Next, a register initialization is performed on the first and second storage devices (step S600). For example, as illustrated in FIG. 9B, an initialization operation and/or an initial setting operation may be performed on the first and second registers 940 and 970 included in the first and second storage devices SD1 and SD2.

Next, the first and second storage devices are determined to be connected (step S700). Step S700 will be described in detail with reference to FIGS. 10, 11A, 11B, and 11C.

Based on a result of checking in step S700, the storage system normally operates by loading firmware stored in the first and second storage devices (step S800). For example, as illustrated in FIG. 9C, firmware FW stored in the first and second non-volatile memories 950 and 980 of the first and second storage devices SD1 and SD2 may be loaded into the first and second buffer memories 930 and 960 of the first and second storage devices SD1 and SD2. Next, as described with reference to FIGS. 4A and 4B, the first and second storage devices SD1 and SD2 may be normally accessed.

Figure 10:
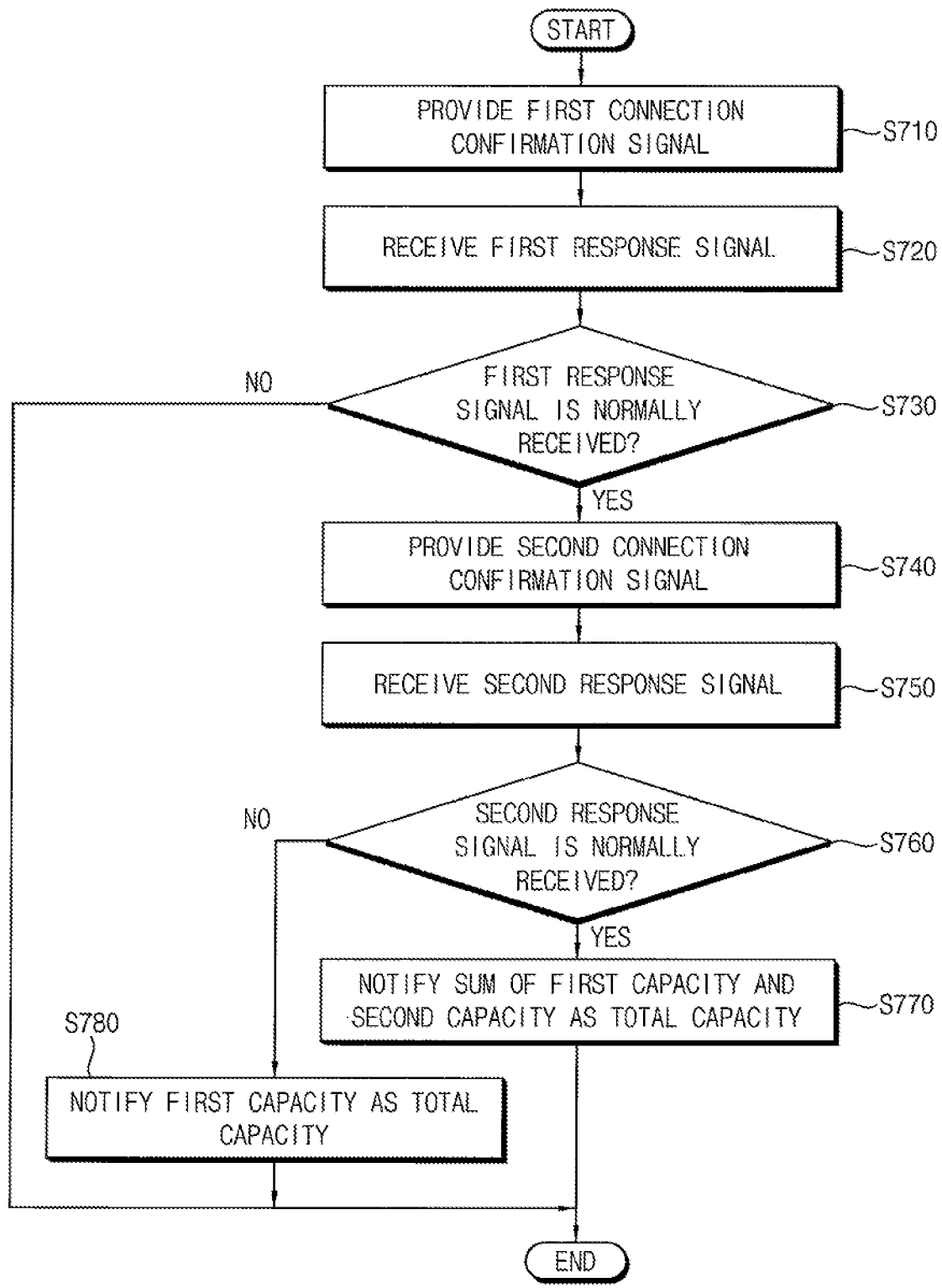
FIG. 10 is a flowchart illustrating an example of checking whether first and second storage devices are normally connected in FIG. 8.
Figure 11A:
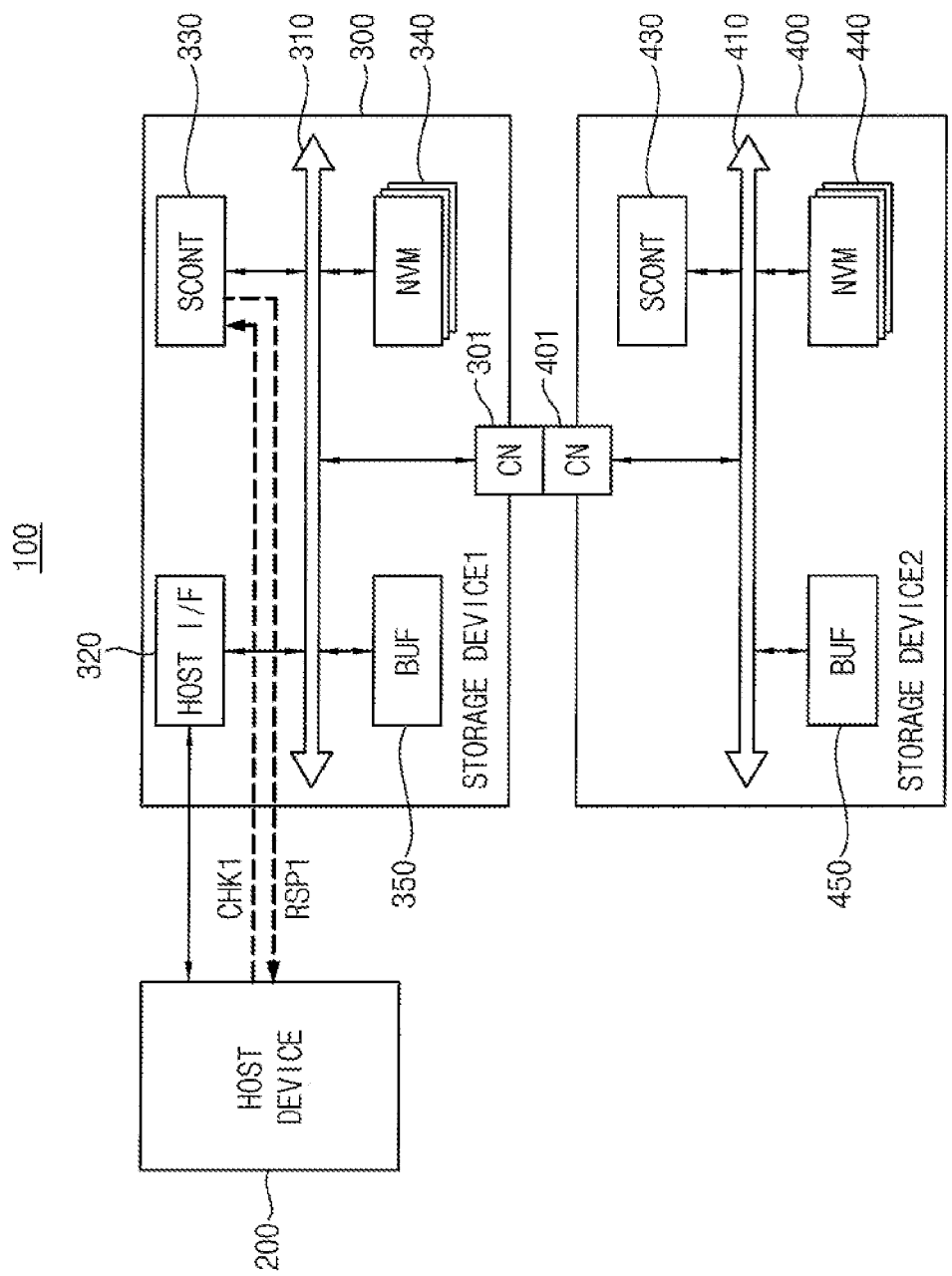
FIGS. 11A, 11B and 11C are diagrams for describing an operation of FIG. 10.
Figure 11B:
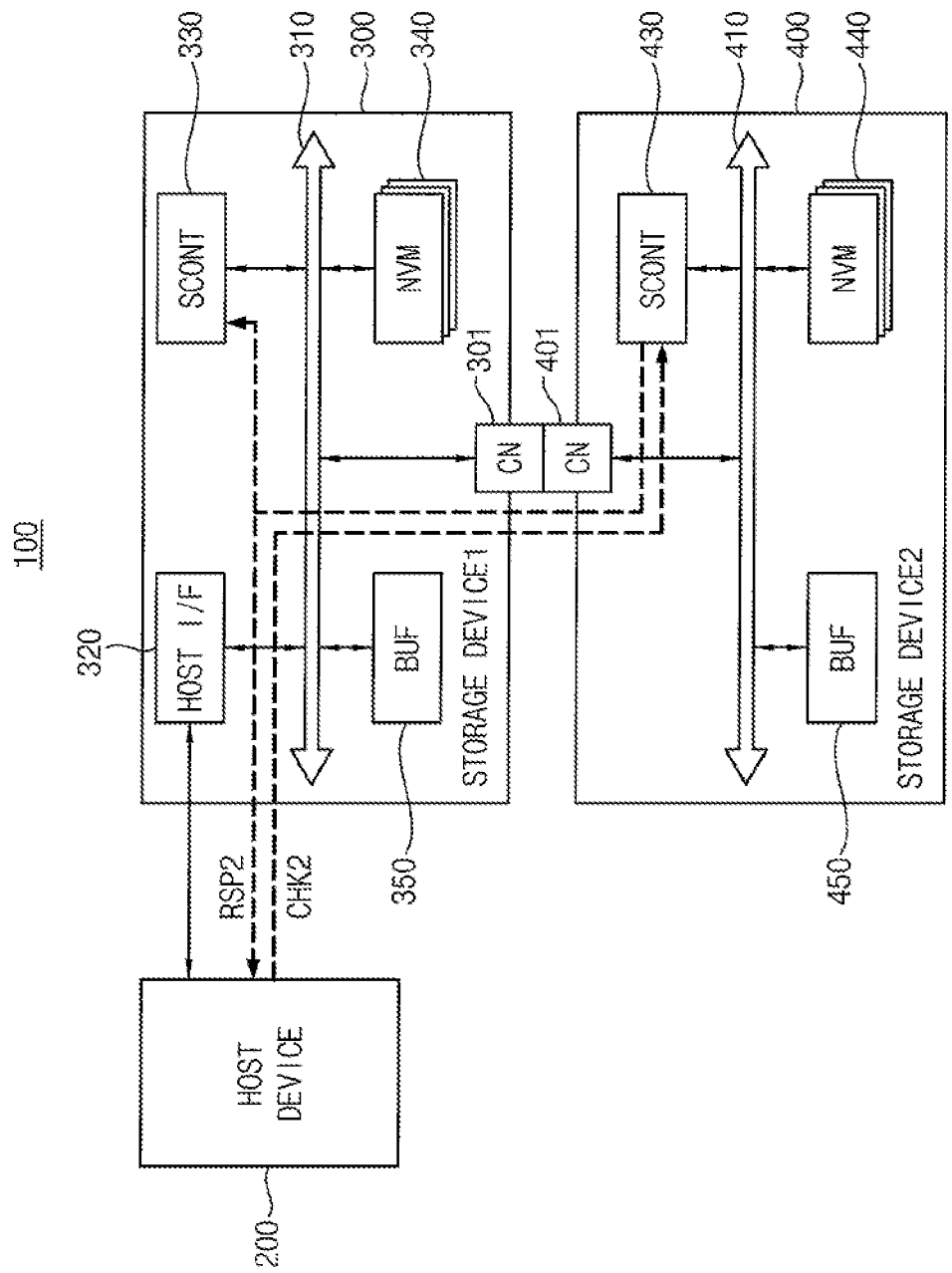
Figure 11C:
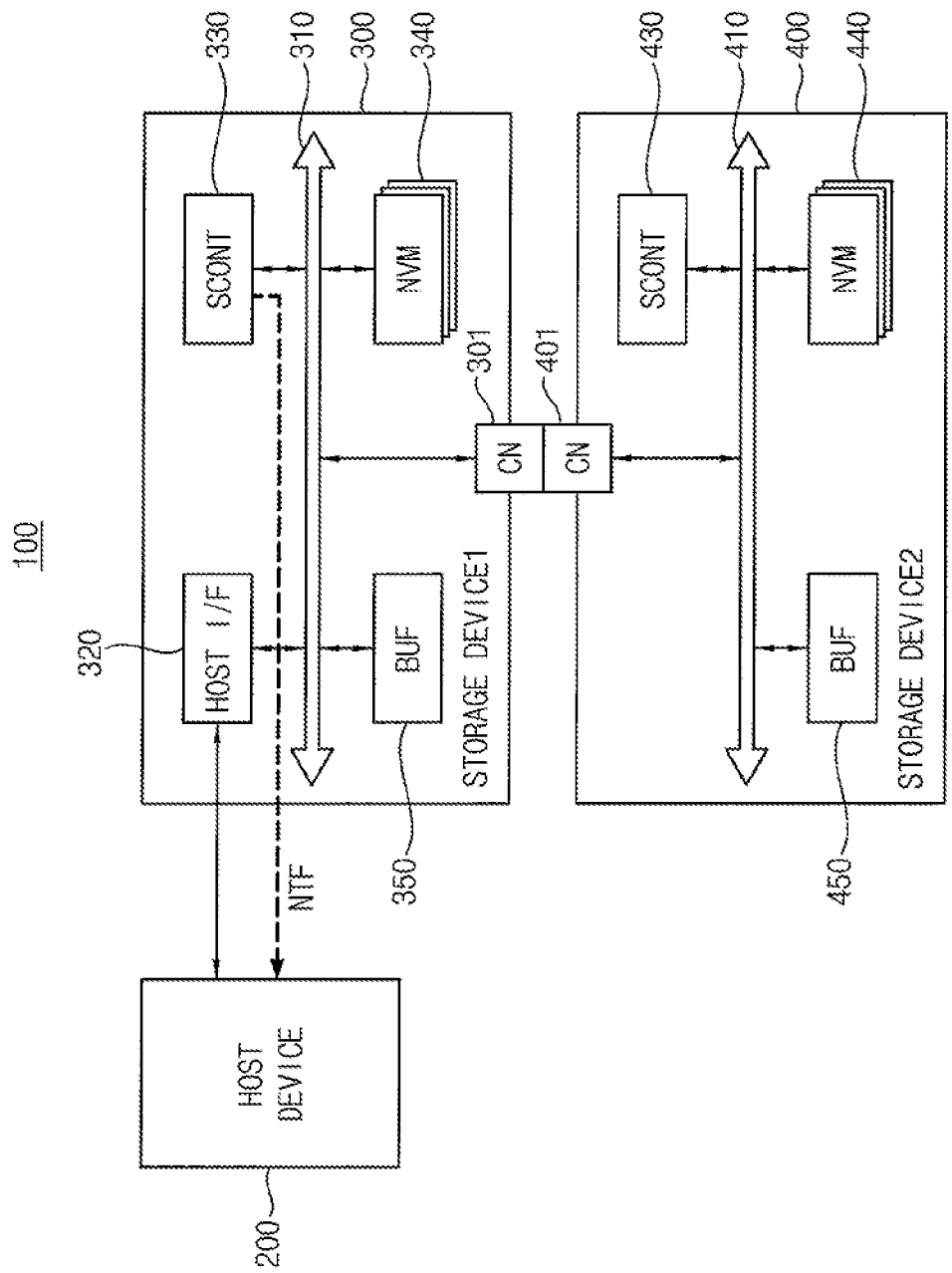

FIG. 10 is a flowchart illustrating an example of checking whether first and second storage devices are normally connected in FIG. 8. FIGS. 11A, 11B, and 11C are diagrams for describing an operation of FIG. 10.

Referring to FIGS. 8, 10, 11A, 11B, and 11C, when checking whether the first and second storage devices are normally connected (step S700), the first storage device is determined to be normally connected.

For example, a first connection confirmation signal may be provided to the first storage device (step S710), and a first response signal may be received from the first storage device based on the first connection confirmation signal (step S720). For example, as illustrated in FIG. 11A, a first connection confirmation signal CHK1 may be provided from the host device 200 to the first storage controller 330 through the host interface 320 and the first bus 310, and a first response signal RSP1 may be provided from the first storage controller 330 to the host device 200 through the first bus 310 and the host interface 320.

The first response signal may not be normally received (step S730: NO), indicating that the first storage device, which is the main storage device, is not normally connected. Therefore, the process may be terminated without performing a subsequent procedure. In some example embodiments, an error message indicating a connection error of the first storage device may be output.

When the first response signal is normally received (step S730: YES), the second storage device is determined to be normally connected.

For example, a second connection confirmation signal may be provided to the second storage device (step S740), and a second response signal may be received from the second storage device based on the second connection confirmation signal (step S750). For example, as illustrated in FIG. 11B, a second connection confirmation signal CHK2 may be transmitted from the host device 200 to the second storage controller 430 through the host interface 320, the first bus 310, the first connector 301, the second connector 401 and the second bus 410, and a second response signal RSP2 may be transmitted from the second storage controller 430 to the host device 200 through the second bus 410, the second connector 401, the first connector 301, the first bus 310 and the host interface 320. The first storage controller 330 may also receive the second response signal RSP2.

The total capacity of the storage system may be notified to the host device depending on whether the second response signal is normally received. For example, as illustrated in FIG. 11C, a notification signal NTF for indicating the total capacity may be provided from the first storage controller 330 to the host device 200 through the first bus 310 and the host interface 320.

When the second response signal is normally received (step S760: YES), the second storage device is determined to be normally connected to the first storage device. The capacity of the sum of the first capacity of the first storage device and the second capacity of the second storage device may be notified to the host device as the total capacity of the storage system (step S770).

When the second response signal is not normally received (step S760: NO), the second storage device is determined to not be normally connected to the first storage device, and the first capacity of the first storage device may be notified to the host device as the total capacity of the storage system. In some example embodiments, an error message indicating a connection error of the second storage device may be output.

According to example embodiments, one or more sub storage devices connected to the main storage device are checked to be normally connected in step S700. Therefore, a delay time (or a response time) for performing step S700, according to example embodiments, may be longer than a default delay time (or a reference delay time) for checking whether a storage device is normally connected in a conventional storage system.

As will be appreciated by those skilled in the art, the inventive concept may be embodied as a system, method, computer program product, and/or a computer program product embodied in one or more computer-readable medium(s) with computer-readable program code embodied thereon. The computer-readable program code may be provided to a processor of a general purpose computer, special purpose computer, or other programmable data processing apparatus. The computer-readable medium may be a computer-readable signal medium or a computer-readable storage medium. The computer-readable storage medium may be any tangible medium containing or storing a program for use by or in connection with an instruction execution system, apparatus, or device. For example, the computer-readable medium may be a non-transitory computer-readable medium.

Figure 12:
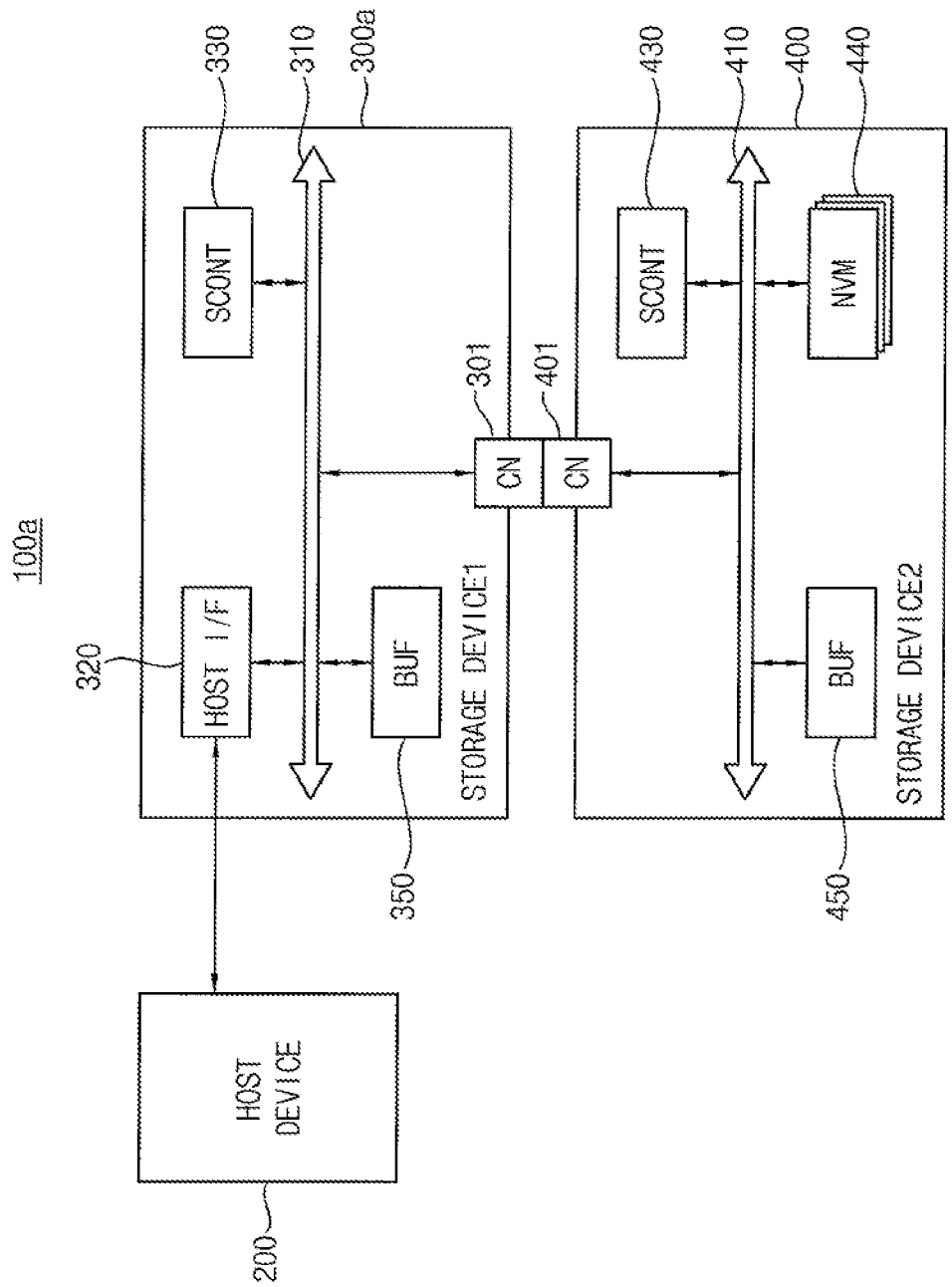
FIG. 12 is a diagram illustrating a storage system according to example embodiments.
Figure 13:
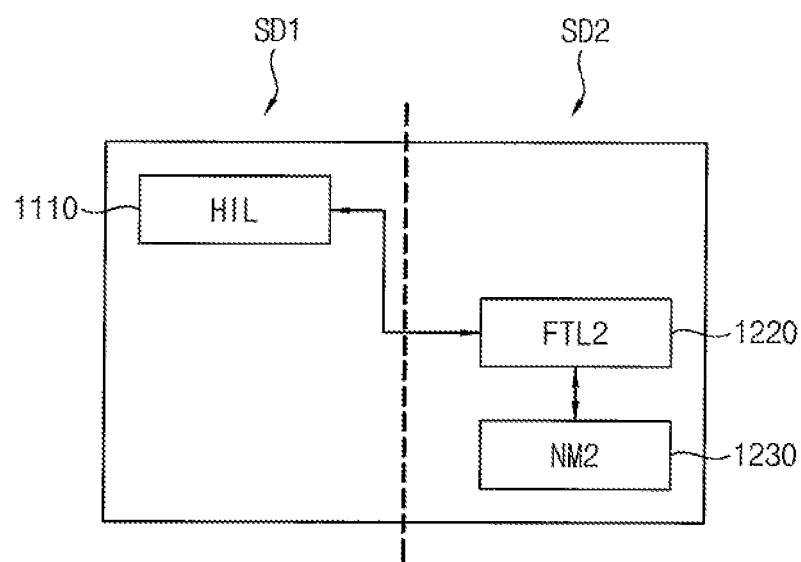
FIG. 13 is a diagram for describing an operation of the storage system of FIG. 12.

FIG. 12 is a diagram illustrating a storage system according to example embodiments. FIG. 13 is a diagram for describing an operation of the storage system of FIG. 12. The descriptions repeated with FIGS. 1 and 3 will be omitted.

Referring to FIG. 12, a storage system 100a includes a host device 200, a first storage device 300a, and a second storage device 400.

The storage system 100a of FIG. 12 may be substantially the same as the storage system 100 of FIG. 1, except that the plurality of first non-volatile memories 340 are omitted in the first storage device 300a of FIG. 12.

Although the first storage device 300a includes the host interface 320 and operates as the main storage device, the first storage device 300a may not include the plurality of first non-volatile memories 340. Therefore, the first storage device 300a may not operate as a storage medium. Therefore, the storage system 100a of FIG. 12 may normally operate when the second storage device 400 operating as the sub storage device is connected to the first storage device 300a. Since the first storage device 300a does not include the plurality of first non-volatile memories 340, the first storage device 300a may be implemented in a smaller size than the first storage device 300 in FIG. 1.

Referring to FIG. 13, a hierarchical structure of software executed by the storage system 100a of FIG. 12 is illustrated. As described, software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

An example of FIG. 13 may be substantially the same as the example of FIG. 3, except that the first flash translation layer 1120 and the first non-volatile memory manager 1130 included in the first storage device SD1 are omitted.

Figure 14:
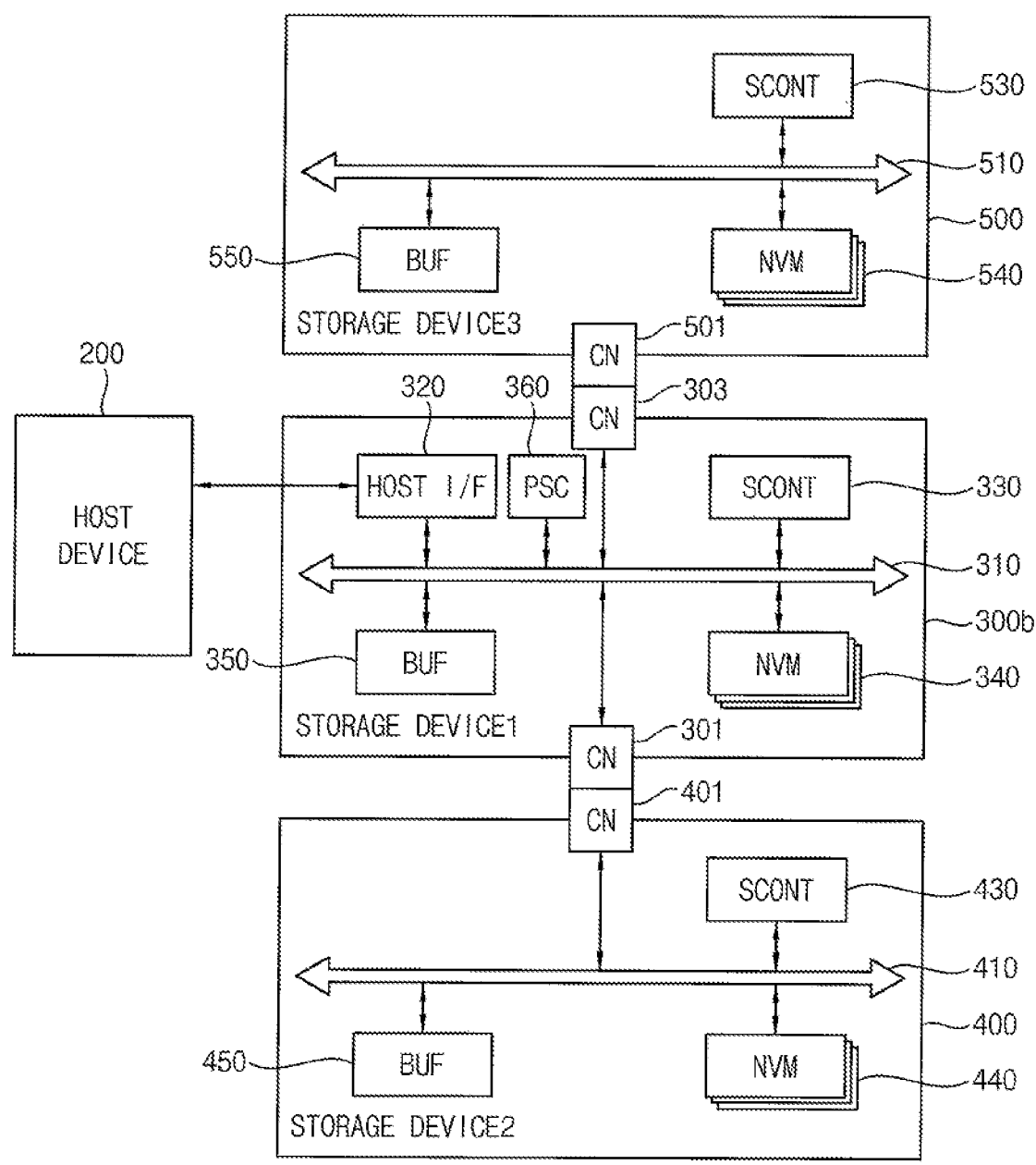
FIG. 14 is a diagram illustrating a storage system according to example embodiments.
Figure 15:
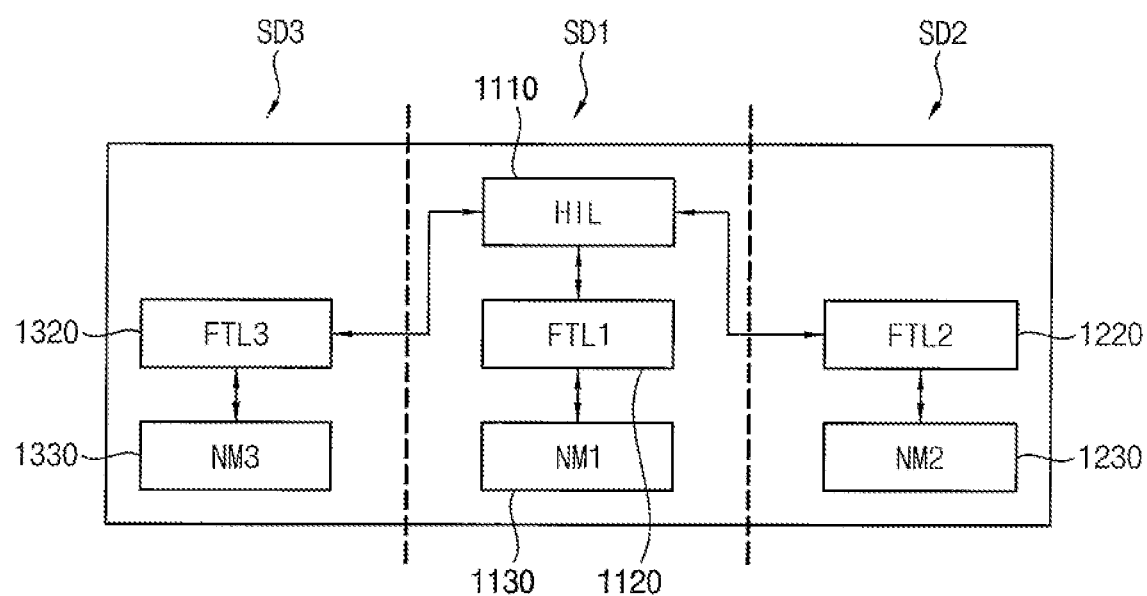
FIG. 15 is a diagram for describing an operation of the storage system of FIG. 14.

FIG. 14 is a diagram illustrating a storage system according to example embodiments. FIG. 15 is a diagram for describing an operation of the storage system of FIG. 14. The descriptions repeated with FIGS. 1 and 3 will be omitted.

Referring to FIG. 14, a storage system 100b includes a host device 200, a first storage device 300b, a second storage device 400, and a third storage device 500.

The storage system 100b of FIG. 14 may be substantially the same as the storage system 100 of FIG. 1, except that the first storage device 300b further includes a third connector 303 and a power supply circuit (PSC) 360 and the storage system 100b further includes the third storage device 500 directly connected to the first storage device 300b.

The third connector 303 may be a component for a connection with the third storage device 500. For example, the first storage device 300b may be directly connected to the third storage device 500 through the third connector 303. The third connector 303 may have substantially the same structure as the first connector 301.

The power supply circuit 360 may supply power to the second storage device 400 and the third storage device 500. Since the first storage device 300b further includes the power supply circuit 360, the power may be stably supplied to some or all storage devices even when several sub storage devices are simultaneously connected to one main storage device. In some example embodiments, the power supply circuit 360 may be omitted.

The third storage device 500 is accessed by the host device 200. The third storage device 500 is directly connected to the first storage device 300b, and has a third capacity. The third storage device 500 may include a fourth connector 501, a third bus 510, a third storage controller 530, a plurality of third non-volatile memories 540, and a third buffer memory 550. The third storage device 500 may communicate with the host device 200 through the host interface 320 included in the first storage device 300.

The fourth connector 501, the third bus 510, the third storage controller 530, the plurality of third non-volatile memories 540, and the third buffer memory 550 included in the third storage device 500. may be substantially the same as the second connector 401, the second bus 410, the second storage controller 430, the plurality of second non-volatile memories 440 and the second buffer memory 450 included in the second storage device 400, respectively. Therefore, the repeated descriptions will be omitted.

When the first to third storage devices 300b, 400, and 500 are connected by the first to fourth connectors 301, 401, 303, and 501, the storage system 100b may have a total capacity of a sum of the first capacity of the first storage device 300b, the second capacity of the second storage device 400 and the third capacity of the third storage device 500.

Referring to FIG. 15, a hierarchical structure of software executed by the storage system 100b of FIG. 14 is illustrated. As described, software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

An example of FIG. 15 may be substantially the same as the example of FIG. 3, except that a third storage device SD3 is added.

A third storage controller (e.g., the third storage controller 530 in FIG. 14) included in the third storage device SD3 may execute a third flash translation layer (FTL3) 1320 and a third non-volatile memory manager (NM3) 1330 based on a control of the host interface layer 1110, and may access a plurality of third non-volatile memories (e.g., the plurality of third non-volatile memories 540 in FIG. 14). The third storage device SD3 may not include the host interface 320 and the host interface layer 1110, and may communicate with the host device 200 using the host interface 320 and the host interface layer 1110 in the first storage device SD1.

Figure 16:
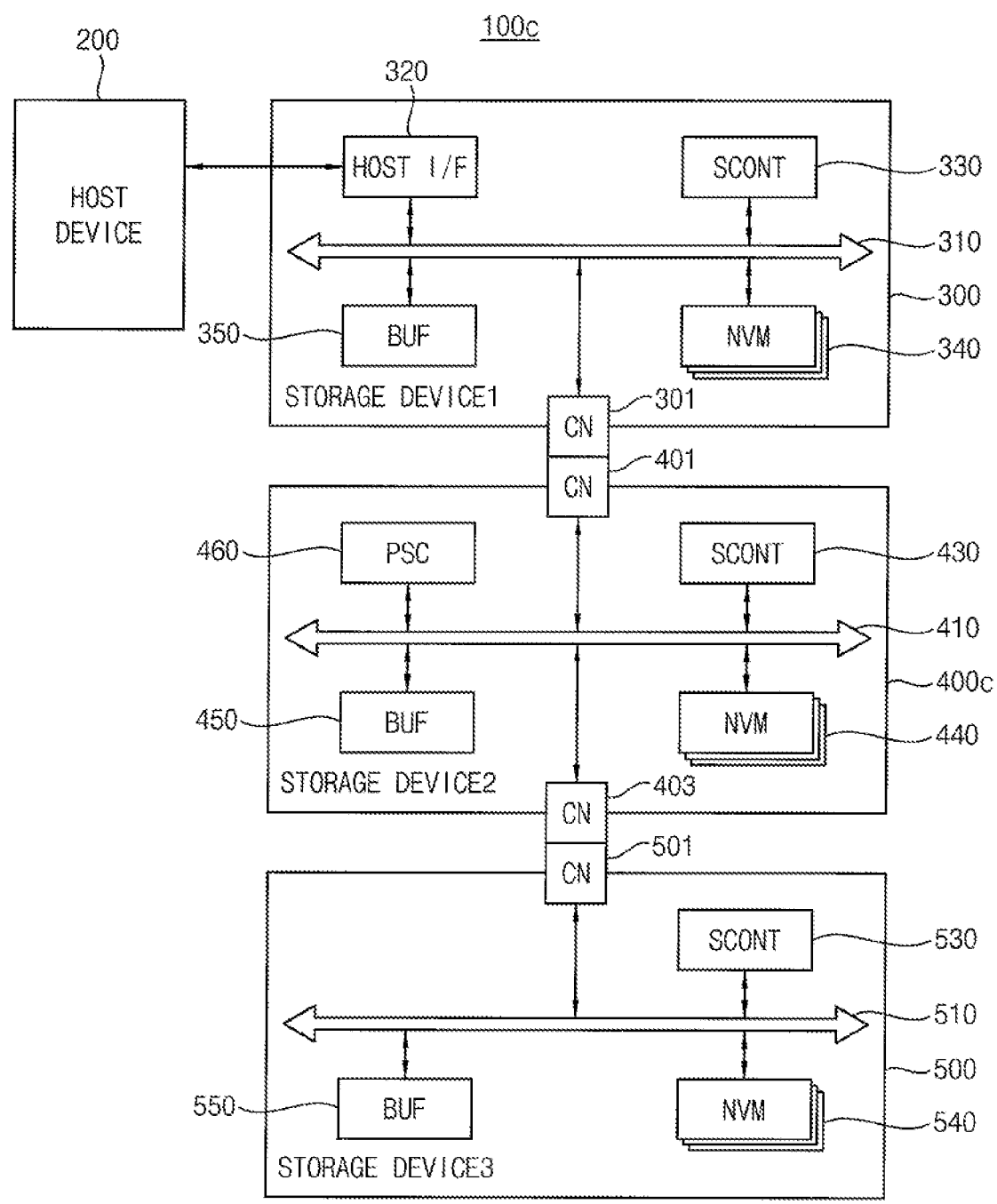
FIG. 16 is a diagram illustrating a storage system according to example embodiments.
Figure 17:
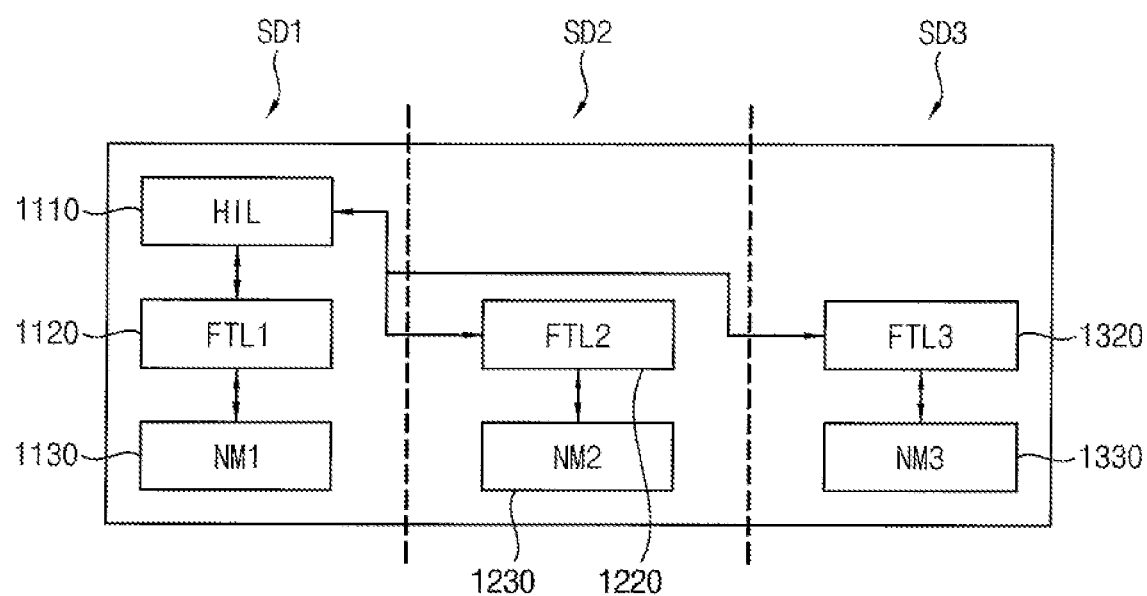
FIG. 17 is a diagram for describing an operation of the storage system of FIG. 16.

FIG. 16 is a diagram illustrating a storage system according to example embodiments. FIG. 17 is a diagram for describing an operation of the storage system of FIG. 16. The descriptions repeated with FIGS. 1, 3, 14, and 15 will be omitted.

Referring to FIG. 16, a storage system 100c includes a host device 200, a first storage device 300, a second storage device 400c and a third storage device 500.

The storage system 100c of FIG. 16 may be substantially the same as the storage system 100 of FIG. 1, except that the second storage device 400c further includes a third connector 403 and a power supply circuit 460 and the storage system 100c further includes the third storage device 500 directly connected to the second storage device 400c.

The third connector 403 and the power supply circuit 460 included in the second storage device 400c may be substantially the same as the third connector 303 and the power supply circuit 360 included in the first storage device 300b of FIG. 14, respectively. The power supply circuit 460 may supply power to the third storage device 500. Since the second storage device 400c further includes the power supply circuit 460, the power may be stably supplied to the storage devices at a later stage.

The third storage device 500 may be substantially the same as the third storage device 500 in FIG. 14, except that the third storage device 500 is directly connected to the second storage device 400c other than the first storage device 300. The third storage device 500 may communicate with the host device 200 through the host interface 320 included in the first storage device 300 and the second storage device 400c.

When the first to third storage devices 300, 400c, and 500 are connected by the first to fourth connectors 301, 401, 403, and 501, the storage system 100c may have a total capacity of a sum of the first capacity of the first storage device 300, the second capacity of the second storage device 400c and the third capacity of the third storage device 500.

Referring to FIG. 17, a hierarchical structure of software executed by the storage system 100c of FIG. 16 is illustrated. As described, software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

An example of FIG. 17 may be substantially the same as the example of FIG. 3, except that a third storage device SD3 is added. The third storage device SD3, the third flash translation layer 1320, and the third non-volatile memory manager 1330 may be substantially the same as those described with reference to FIG. 15.

Although example embodiments are described based on examples where one or two sub storage devices are additionally connected, example embodiments are not limited thereto. For example, three or more sub storage devices may be additionally connected to the main storage device.

Figure 18:
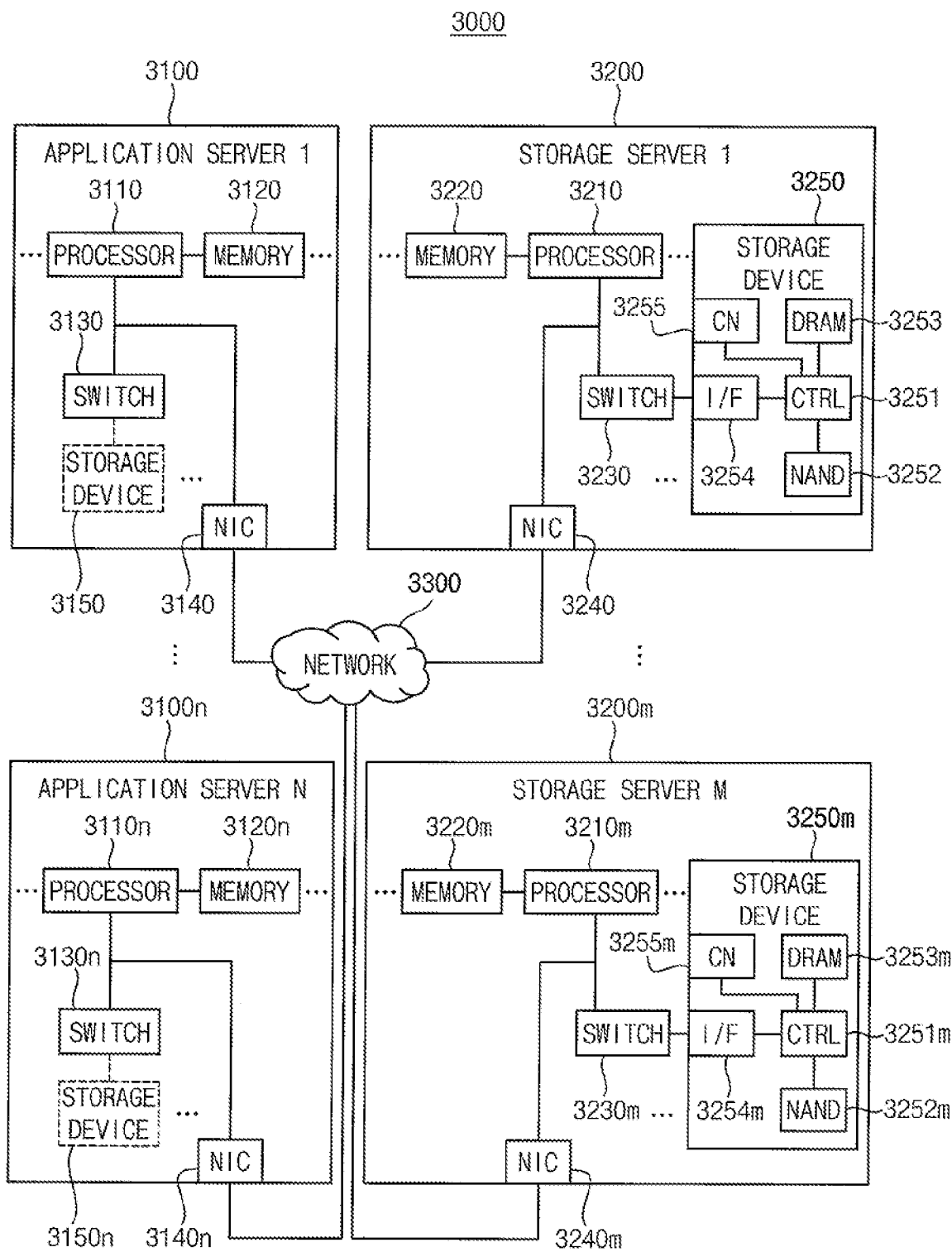
FIG. 18 is a block diagram illustrating a data center including a storage system according to example embodiments.

FIG. 18 is a block diagram illustrating a data center including a storage system according to example embodiments.

Referring to FIG. 18, a data center 3000 may be a facility that collects various types of data and provides various services, and may be referred to as a data storage center. The data center 3000 may be a system for operating search engines and databases and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments. The number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220.

The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a non-volatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100$n$ and the storage servers 3200 to 3200$m$ may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200$m$ may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general or normal network such as the TCP/IP network. For example, the network 3300 may be implemented according to at least one of protocols such as an FC over Ethernet (FCoE), a network attached storage (NAS), a non-volatile memory express (NVMe) over Fabrics (NVMe-oF), etc.

Hereinafter, example embodiments will be described based on the application server 3100 and the storage server 3200. The description of the application server 3100 may be applied to the other application server 3100$n$, and the description of the storage server 3200 may be applied to the other storage server 3200$m$.

The application server 3100 may store data requested to be stored by a user or a client into one of the storage servers 3200 to 3200$m$ through the network 3300. Additionally, or alternatively, the application server 3100 may obtain data requested to be read by the user or the client from one of the storage servers 3200 to 3200$m$ through the network 3300. For example, the application server 3100 may be implemented as a web server or a database management system (DBMS).

The application server 3100 may access a memory 3120$n$ or a storage device 3150$n$ included in the other application server 3100$n$ through the network 3300, and/or may access the memories 3220 to 3220$m$ or the storage devices 3250 to 3250$m$ included in the storage servers 3200 to 3200$m$ through the network 3300. Therefore, the application server 3100 may perform various operations on data stored in the application servers 3100 to 3100$n$ and/or the storage servers 3200 to 3200$m$. For example, the application server 3100 may execute a command for moving or copying data between the application servers 3100 to 3100$n$ and/or the storage servers 3200 to 3200$m$. The data may be transferred from the storage devices 3250 to 3250$m$ of the storage servers 3200 to 3200$m$ to the memories 3120 to 3120$n$ of the application servers 3100 to 3100$n$ directly or through the memories 3220 to 3220$m$ of the storage servers 3200 to 3200$m$. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and the storage device 3250.

In the storage servers 3200 to 3200$m$ and/or the application servers 3100 to 3100$n$, the processor may transmit a command to the storage devices 3150 to 3150$n$ and 3250 to 3250$m$ or the memories 3120 to 3120$n$ and 3220 to 3220$m$ to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150$m$ and 3250 to 3250$m$ may transmit a control signal and command/address signals to NAND flash memory devices 3252 to 3252$m$ in response to a read command received from the processor. When data is read from the NAND flash memory devices 3252 to 3252$m$, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control the overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store metadata. The metadata may be data generated by the controller 3251 to manage user data or the NAND flash memory device 3252. The storage device 3250 may include a connector (CN) 3255 and may be implemented in the form of the module-type storage device with capacity scalability.

The storage devices 3150 to 3150m and 3250 to 3250m may be implemented based on the storage system and the method according to example embodiments described with reference to FIGS. 1 through 17.

The inventive concept may be applied to various electronic devices and systems that include storage devices and storage systems. For example, the inventive concept may be applied to systems such as a PC, a server computer, a data center, a workstation, a mobile phone, a smartphone, a tablet computer, a laptop computer, a PDA, a PMP, a digital camera, a portable game console, a music player, a camcorder, a video player, a navigation device, a wearable device, an IoT device, an IoE device, an e-book reader, a VR device, an AR device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage system comprising:
  a first storage device with a first capacity, wherein the first storage device is connected to a host device and comprises a host interface for communicating with the host device, wherein the first storage device is configured to operate a host interface layer (HIL) using the host interface and a first flash translation layer (FTL); and
  a second storage device with a second capacity, wherein the second storage device is connected to the first storage device and is configured to communicate with the host device through the host interface included in the first storage device, wherein the second storage device is configured to operate a second flash translation layer (FTL) in communication with the HIL of the first storage device, and
  wherein the storage system has a third capacity, the third capacity comprising a sum of at least the first capacity and the second capacity.

2. The storage system of claim 1, wherein the first storage device further comprises:
  a first bus connected to the host interface;
  a first storage controller connected to the first bus, wherein the first storage controller is configured to control an operation of the first storage device; and
  a first connector connected to the first bus, wherein the first connector is configured to form a connection between the first storage device and the second storage device.

3. The storage system of claim 2, wherein the first storage device further comprises:
  a plurality of first non-volatile memory devices connected to the first bus, wherein the plurality of first non-volatile memory devices is configured to store data.

4. The storage system of claim 2, wherein the second storage device comprises:
  a second bus;
  a second storage controller connected to the second bus, wherein the second storage controller is configured to control an operation of the second storage device;
  a plurality of second non-volatile memory devices connected to the second bus, wherein the plurality of second non-volatile memory devices is configured to store data; and
  a second connector connected to the second bus, wherein the second connector is configured to form a connection between the second storage device and the first storage device.

5. The storage system of claim 4, wherein the first connector and the second connector are connected to electrically connect the first bus with the second bus.

6. The storage system of claim 4, wherein the first connector and the second connector are connected through a wired cable.

7. The storage system of claim 4, wherein:
  the first storage controller is configured to execute the HIL based on the host interface, and
  the second storage controller is configured to execute the FTL and a non-volatile memory manager (NM) based on a control of the HIL to access the plurality of second non-volatile memory devices.

8. The storage system of claim 7, wherein the second storage device does not include the host interface and the HIL.

9. The storage system of claim 1, wherein, when the storage system is powered on, a basic input output system (BIOS) stored in the host device is loaded, a boot loader stored in at least one of the first and second storage devices is loaded, a register initialization is performed on the first and second storage devices, the second storage device connection is checked based on whether a connection confirmation signal is provided to the second storage device and whether a response signal is received from the second storage device, and the storage system operates by loading firmware stored in the first storage device and the second storage device.

10. The storage system of claim 9, further comprising:
  determining, when the response signal is received, that the second storage device is connected to the first storage device; and
  notifying the host device that the third capacity is a total capacity of the storage system.

11. The storage system of claim 9, further comprising:
determining, when the response signal is not normally received, that the second storage device is not connected to the first storage device; and
notifying the host device that the first capacity is a total capacity of the storage system.

12. The storage system of claim 1, further comprising:
a third storage device with a fourth capacity, wherein the third storage device is directly connected to the first storage device and is configured to communicate with the host device through the host interface included in the first storage device, and
wherein the third capacity comprises a sum of the first capacity, the second capacity, and the fourth capacity.

13. The storage system of claim 12, wherein the first storage device further comprises:
a power supply circuit configured to supply power to the second storage device and the third storage device.

14. The storage system of claim 1, further comprising:
a third storage device with a fourth capacity, wherein the third storage device is connected to the second storage device and is configured to communicate with the host device through the host interface included in the first storage device and the second storage device, and
wherein the third capacity comprises a sum of the first capacity, the second capacity, and the fourth capacity.

15. The storage system of claim 14, wherein the second storage device comprises:
a power supply circuit configured to supply power to the third storage device.

16. The storage system of claim 1, wherein each of the first storage device and the second storage device comprises a solid state drive (SSD).

17. The storage system of claim 1, wherein each of the first storage device and the second storage device comprises one of a universal flash storage (UFS), a multimedia card (MMC), and an embedded MMC (eMMC).

18. The storage system of claim 1, wherein the host interface supports one of an advanced technology attachment (ATA) interface, a serial ATA (SATA) interface, a parallel ATA (PATA) interface, a peripheral component interconnect express (PCIe) interface, a serial attached small computer system (SAS) interface, a small computer system interface (SCSI), a universal serial bus (USB) interface, an eMMC interface, and a UFS interface.

19. A method of operating a storage system, the method comprising:
connecting a first storage device with a first capacity to a host device, wherein the first storage device comprises a host interface;
connecting a second storage device with a second capacity to the first storage device;
powering on the storage system;
loading a basic input output system (BIOS) stored in the host device;
loading a boot loader stored in at least one of the first storage device and the second storage device;
performing a register initialization on the first storage device and the second storage device;
checking whether the second storage device is connected to the first storage device by providing a connection confirmation signal from the host device to the first storage device and from the first storage device to the second storage device and by providing a response signal from the second storage device to the first storage device and from the first storage device to the host device; and
operating the storage system by loading firmware stored in the first storage device and the second storage device.

20. A storage system comprising:
a host device;
a first storage device with a first capacity, wherein the first storage device is connected to the host device; and
a second storage device with a second capacity, wherein the second storage device is connected to the first storage device and is configured to communicate with the host device through the first storage device,
wherein the first storage device comprises:
a host interface for communicating with the host device;
a first storage controller configured to control an operation of the first storage device based on execution of a host interface layer (HIL); and
a first connector configured to form a connection between the first storage device and the second storage device,
wherein the second storage device comprises:
a second storage controller configured to control an operation of the second storage device;
a plurality of non-volatile memories configured to store data; and
a second connector configured to form a connection between the second storage device and the first storage device via the HIL and wherein the second storage device is not configured to operate an additional HIL,
wherein, when the storage system is powered on, a basic input output system (BIOS) stored in the host device is loaded, a boot loader stored in at least one of the first and second storage devices is loaded, a register initialization is performed on the first and second storage devices, the second storage device connection is checked based on whether a connection confirmation signal is provided to the second storage device and whether a response signal is received from the second storage device, and the storage system operates by loading a firmware stored in the first storage device and the second storage device, and
wherein, when the response signal is received, the second storage device is determined to be connected to the first storage device and a third capacity comprising a sum of the first capacity and the second capacity is notified to the host device as a total capacity of the storage system.

* * * * *